June 7, 1949. E. C. STREETER, JR 2,472,129
RADIO NAVIGATION SYSTEM
Filed Aug. 4, 1943 9 Sheets-Sheet 1

INVENTOR
EDWARD C. STREETER JR.
BY
ATTORNEY

INVENTOR
EDWARD C. STREETER JR.
BY
ATTORNEY

INVENTOR
EDWARD C. STREETER JR.
BY
Paul B. Hunter
ATTORNEY

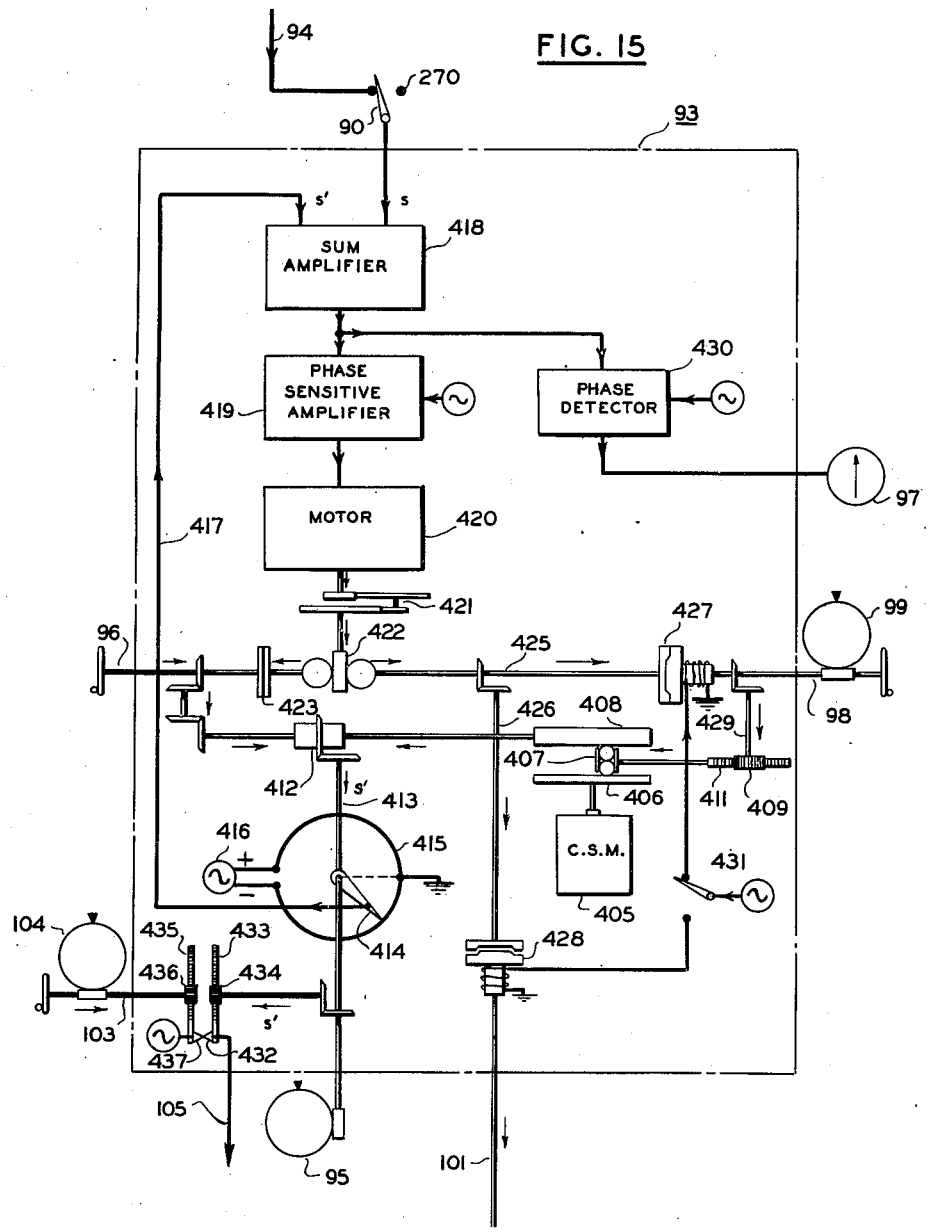

Patented June 7, 1949

2,472,129

UNITED STATES PATENT OFFICE 2,472,129

RADIO NAVIGATION SYSTEM

Edward C. Streeter, Jr., Old Westbury, N. Y., assignor to The Sperry Corporation, a corporation of Delaware Application August 4, 1943, Serial No. 498,706

24 Claims. (Cl. 250—2)

This invention relates generally to radio position finding and, more specifically, to means and methods for the automatic navigation of a mobile craft whereby said craft may be directed to any chosen objective along any selected path or ground track and at any desired ground speed, irrespective of visibility, wind, drift, and other conditions.

There has been a long-standing demand for an automatic radio navigation system which would relieve a navigator from drudgery and allow him to assume a supervisory role. Prior to the present invention a navigator was compelled to play the part of a calculator and a human servo means linking the various navigational aids to the operational controls of a craft. The problem of air navigation has become most acute because of the rising density of air traffic between metropolitan centers, the ever-increasing aircraft speeds, the growing insistence upon accurate airline schedules, the shortened interval between successive flights along the same routes, and the necessity for establishing a plurality of air lanes between important cities to accommodate different types and speeds of passenger, freight, and private air transportation. It is now more important than ever that a navigator not only know the instantaneous position of a craft but that he be enabled to alter this position according to a prescribed space-time relationship. A system of navigation is required that will relieve the navigator of the constant task of acting as a step in the solution of the navigational problem and substitute for him untiringly accurate automatic computers and electromechanical servo devices whose operation he merely has to supervise.

An automatic radio navigation system must possess certain characteristics to gain universal acceptance. It is of utmost importance that reliable operation be secured, since the more functions automatically performed by a device, the greater is the responsibility entrusted to it. The overall errors of a system should be determinable in order that the positional data at all times maintain the required accuracy. The ability of an unlimited number of craft to use the system simultaneously is also highly desirable. A system adaptable for long ranges reduces the number of necessary ground stations to a minimum and relieves the navigator of the burden of constantly setting a new problem into the calculator. The location of a craft is preferably determined quantitatively rather than indicated graphically in order to overcome the scale limitations and lack of flexibility resulting from the employment of maps, and also to provide simple and accurate means for obtaining automatic course and speed control signals. It is desirable that the positional information be provided with reference to general spatial coordinates rather than with relation to the position of a particular ground station in order that the craft's location be comprehensible without resort to special charts or the necessity for mental interpretation. Despite the far-reaching commercial possibilities of a practical system, all known attempts at automatic radio position finding or ground track control have suffered from either serious errors or severe limitations and often both.

Most prior systems of automatic position finding require a knowledge of the absolute orientation of the dirigible craft. On aircraft where the position finding problem is most pressing, this orientation must be supplied from the earth's magnetic field as measured by a magnetically slaved directional gyroscope or similar means. Not only is the direction of the earth's field subject to locally produced deviations which must be corrected, but there can be no accurate knowledge of the magnetic variation since the position of the craft is unknown, and an average value must be employed in any automatic system. Therefore, a system which does not require a knowledge of the craft's orientation is highly desirable.

Many automatic position-finding systems compute position from the directional information supplied by automatic radio direction finders, or they indicate position on a map by means of intersecting pointer arms of appropriately positioned and oriented directional repeaters. Radio direction finders, however, are capable of measuring only the direction from which radio waves arrive, and the assumption that the arriving wave front is perpendicular to the line extending to the radio station is subject to grave qualifications. The local quadrantal error common to all radio loop antennas may be compensated for, but a heterogeneous or irregular character of the terrain lying along the radio transmission path causes an indeterminate bending of the wave front. These variable distortions of direction unfortunately become most pronounced in mountainous regions where accurate navigation is most essential. Another inherent disadvantage of all position finding systems based on directional information is that any error in direction, whatever the cause, introduces an error in position that increases in direct proportion to the distance from the radio transmitter. No known attempt has been made to construct a computer which takes into account the spherical character of the earth. The inclusion of this factor is essential to accurate position finding at any but the shortest distances. Thus, the useful radius of operation of such systems is very restricted.

A solution of the position-finding problem has also been attempted by providing a radio distance-finding apparatus on the dirigible craft. In such a system signals are radiated from the craft, received by fixed ground stations, and reradiated back to the craft. The time intervals between the original transmission of the signals from the craft and the ultimate reception thereat are functions of the distances from the craft to the ground stations, and this information may be employed as the basis for a calculation of position. This procedure, however, has the disadvantage that only a limited number of craft may use the system simultaneously, and every craft must carry bulky and power-consuming transmitting equipment.

It is therefore the principal object of the present invention to provide a novel automatic radio position finding and ground track control system that is based upon distance information without requiring directional radio reception, directional radio transmission, or knowledge of a craft's absolute orientation and yet allowing simultaneous use by an unlimited number of craft over short or long ranges.

Another object is to provide an automatic computer whereby the instantaneous position of a mobile craft is continuously determined from a knowledge of the differences in the distances of said craft from three predetermined points.

Still another object is to provide an automatic computer utilizing the knowledge of the instantaneous position of a craft to indicate said craft's displacement from a desired ground track and distance from a desired objective.

A further object is to provide speed and course control means on a mobile craft whereby a signal caused by a deviation from a desired average ground speed or a desired ground track actuates said respective control means and constrains said craft to alter its position according to a prescribed space-time relationship.

Yet another object is to provide a method of and means for obtaining quantitative expressions for the instantaneous position of a mobile craft by solving two adjacent spherical triangles formed by arcs of great circles interconnecting three spaced radio stations and said craft.

Other objects will become apparent during the course of the following description and in the appended claims.

The essence of the present invention is an automatic radio position-finding system adapted for simultaneous use by an unlimited number of craft over either great or small distances and requiring a minimum number of radio ground stations positioned where convenient. The information derived from these ground stations is in terms of distance rather than direction, and knowledge of a craft's absolute orientation is unnecessary. The functional relationships between the positions of the ground stations, the distance information they supply, and the unknown position of the craft are expressed in terms of physically realizable quantities, such as mechanical rotations, mechanical translations, electrical magnitudes, or electrical phase angles. The intangible mathematical relationships are thus given objective form. The quantities characterizing the unknown positional variables are controlled by electronic, electromechanical or other servo mechanisms that cause these variables to satisfy their respective defining equations through the process of continuously seeking points of equilibrium where errors created by assumed values of the variables vanish. Thus, a craft is continuously supplied with a knowledge of its position with respect to fixed space coordinates. The observed positional data are automatically compared with the desired positional data, and deviations therefrom cause appropriate corrections to the heading and speed of the craft to maintain the observed and desired positions coincident.

The features of the invention will become more apparent in connection with the following detailed description of the illustrated embodiment thereof, together with the accompanying drawings, wherein.

Figures 4, 5, 6, 7, 8:
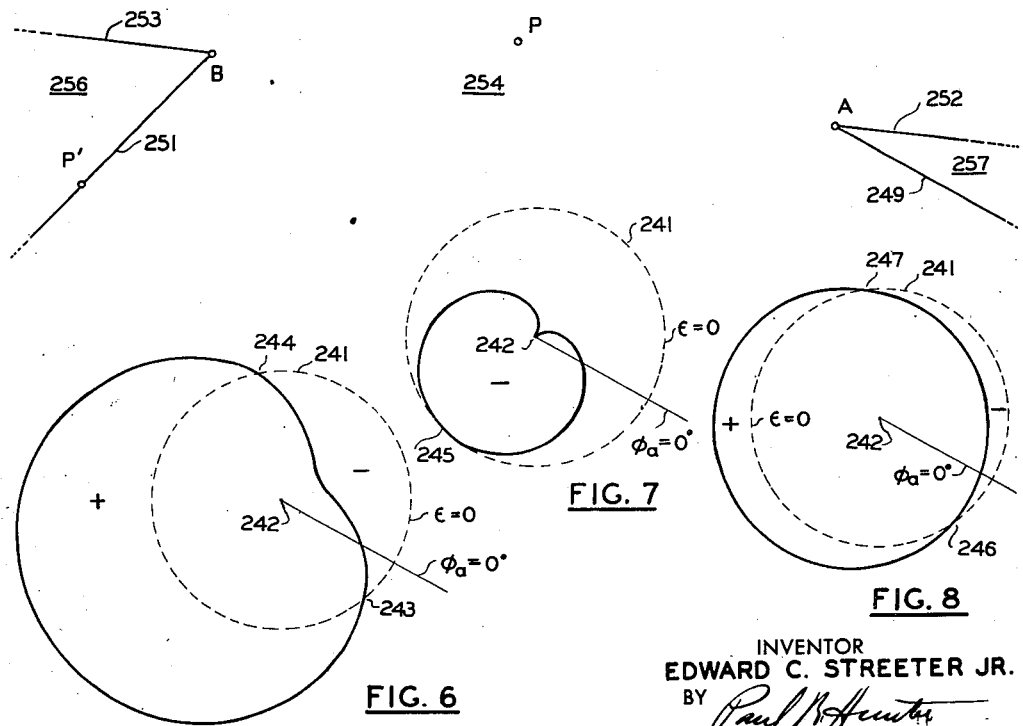
Fig. 4 is a graph illustrating the displacement $d$ of a craft from a desired ground track $S$ and distance $s$ from a desired objective $T$.
Fig. 5 is a graph showing significant operational boundaries of the present system.
Figure 11:
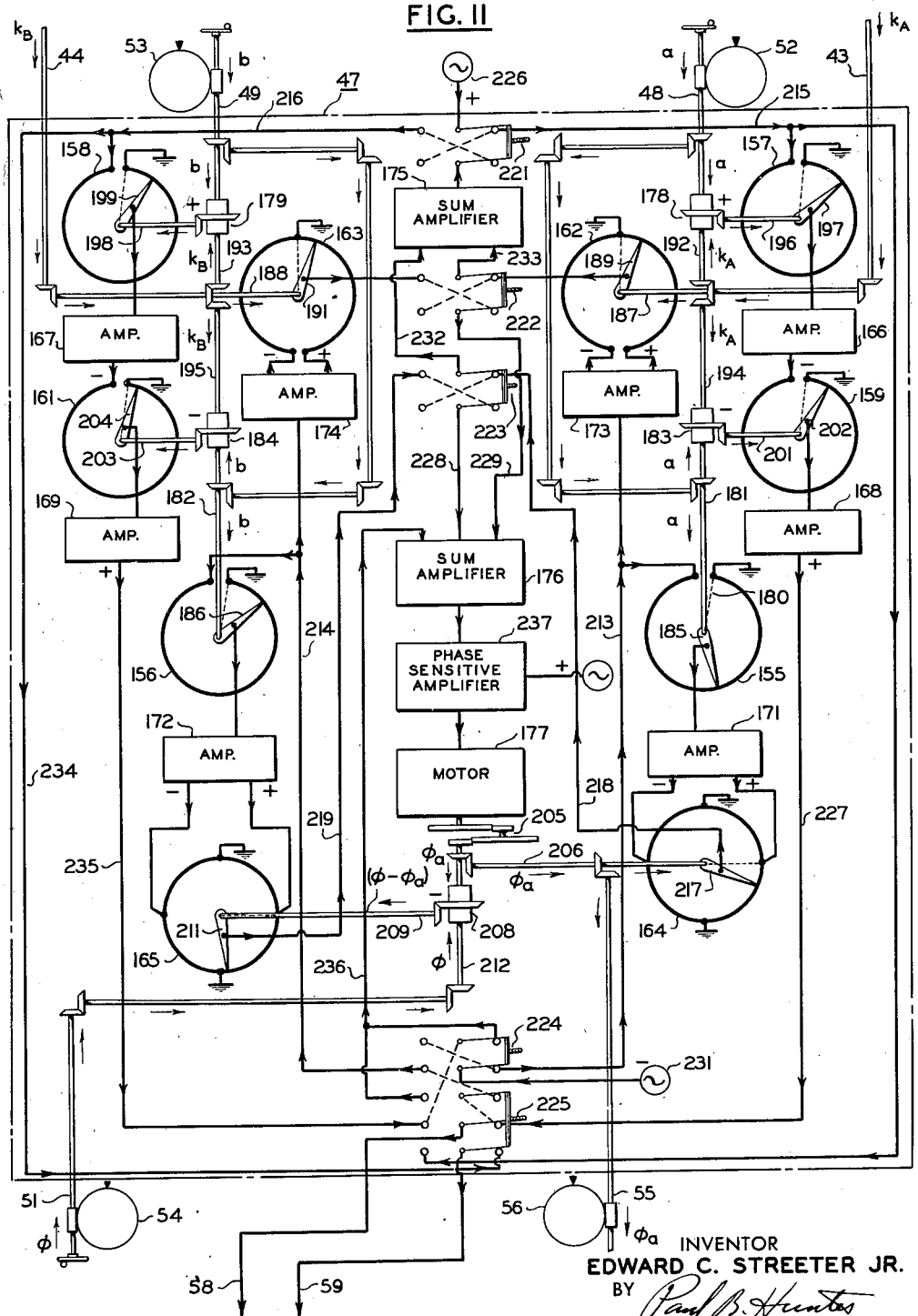

Figs. 6, 7, and 8 are polar graphs illustrating the operation of a servo system shown in Fig. 11.

Figure 9:
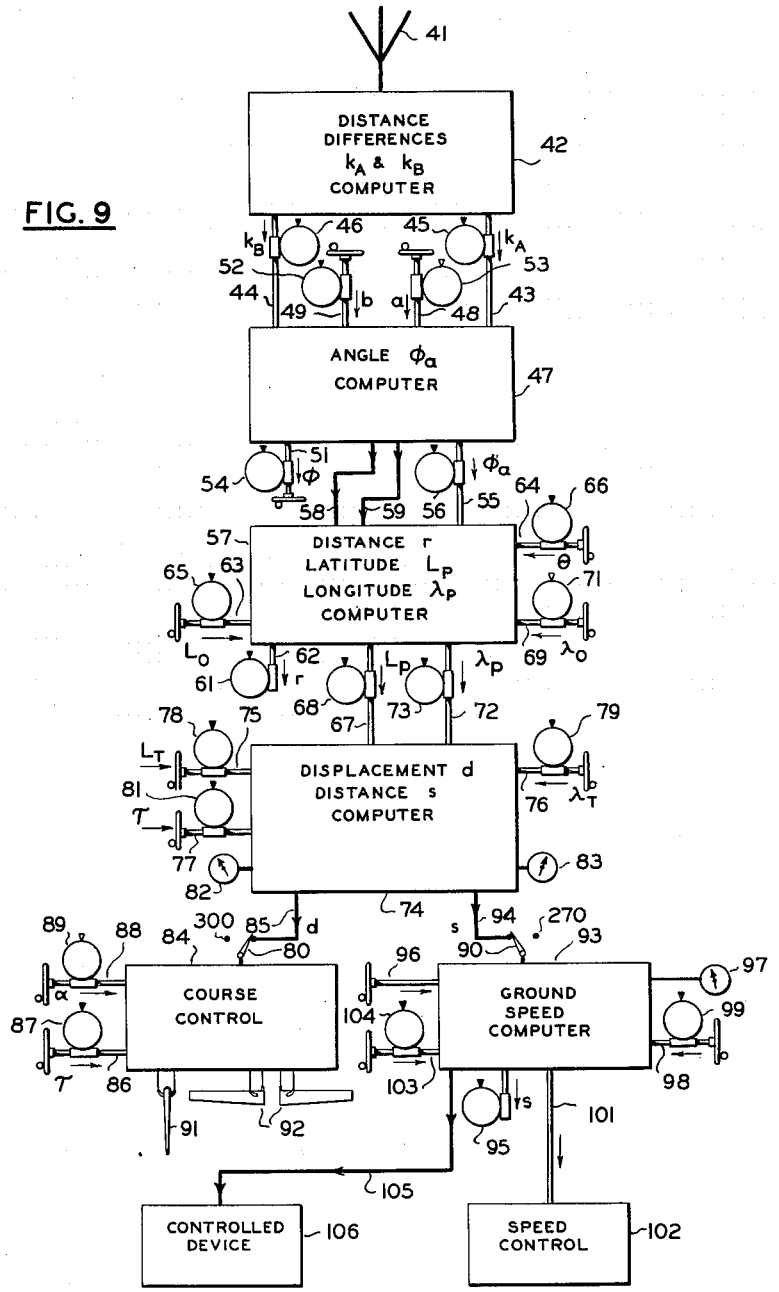

Fig. 9 is a block diagram of an embodiment of the present invention.

Figure 10:
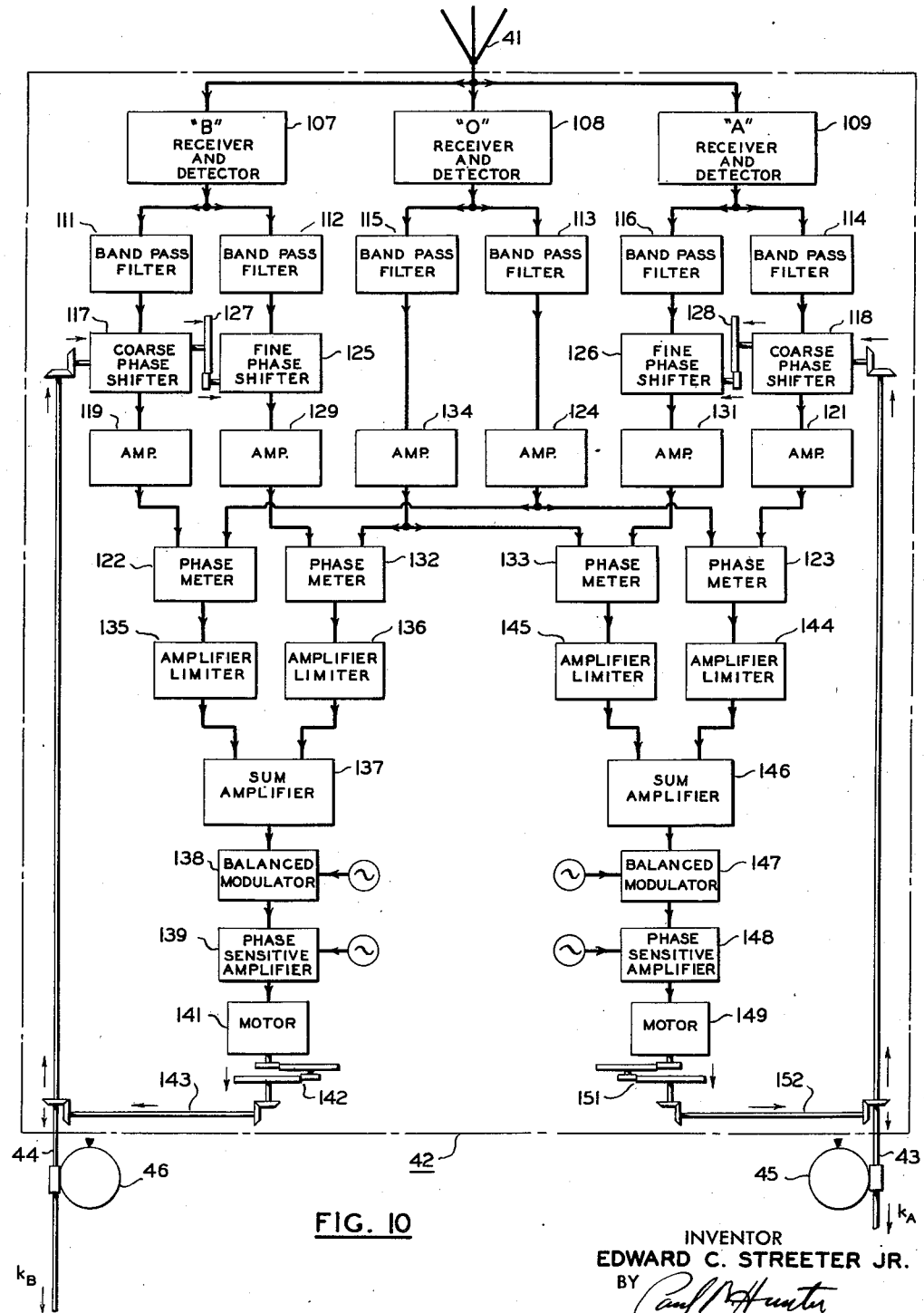
Figure 12:
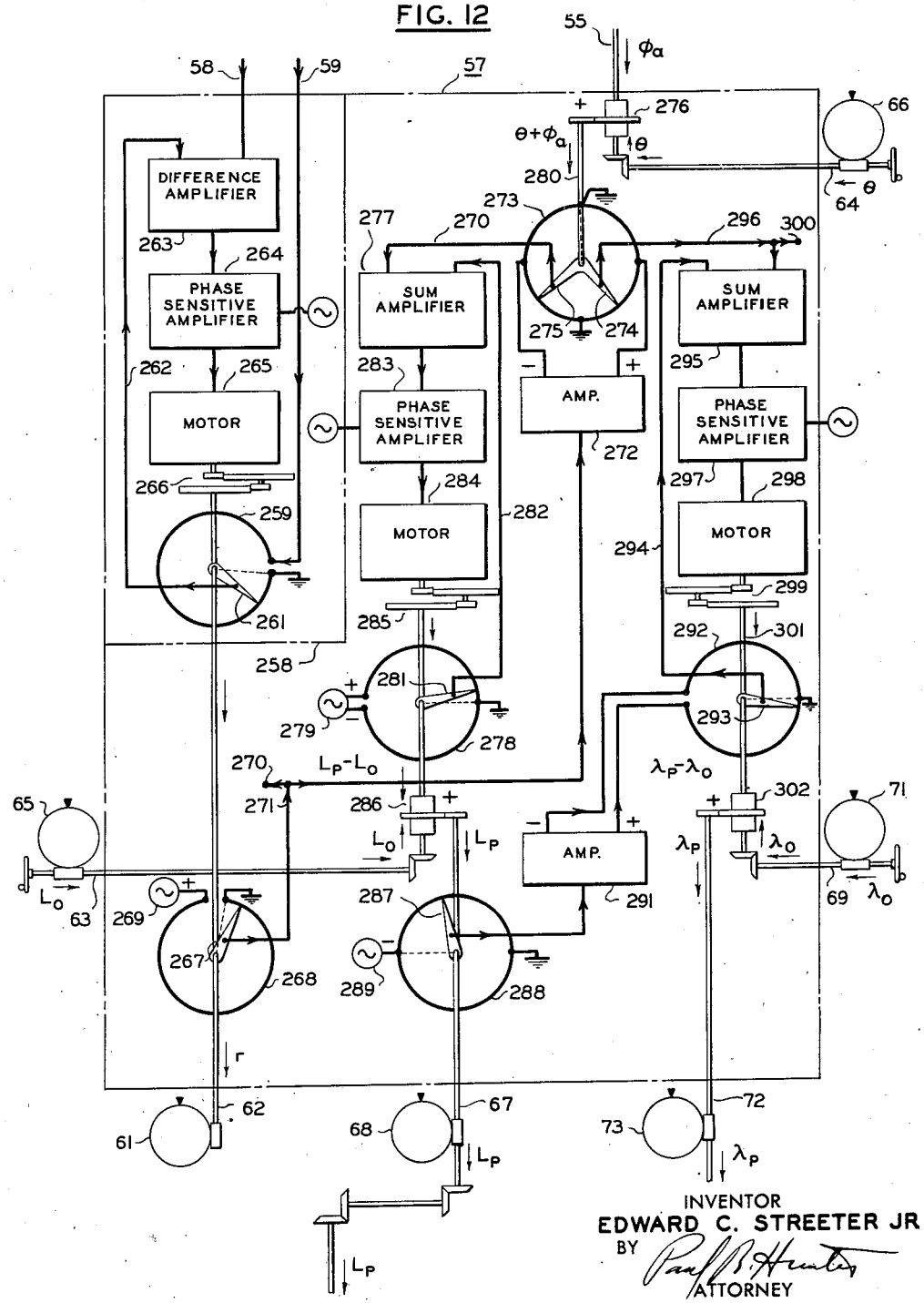
Figure 13:
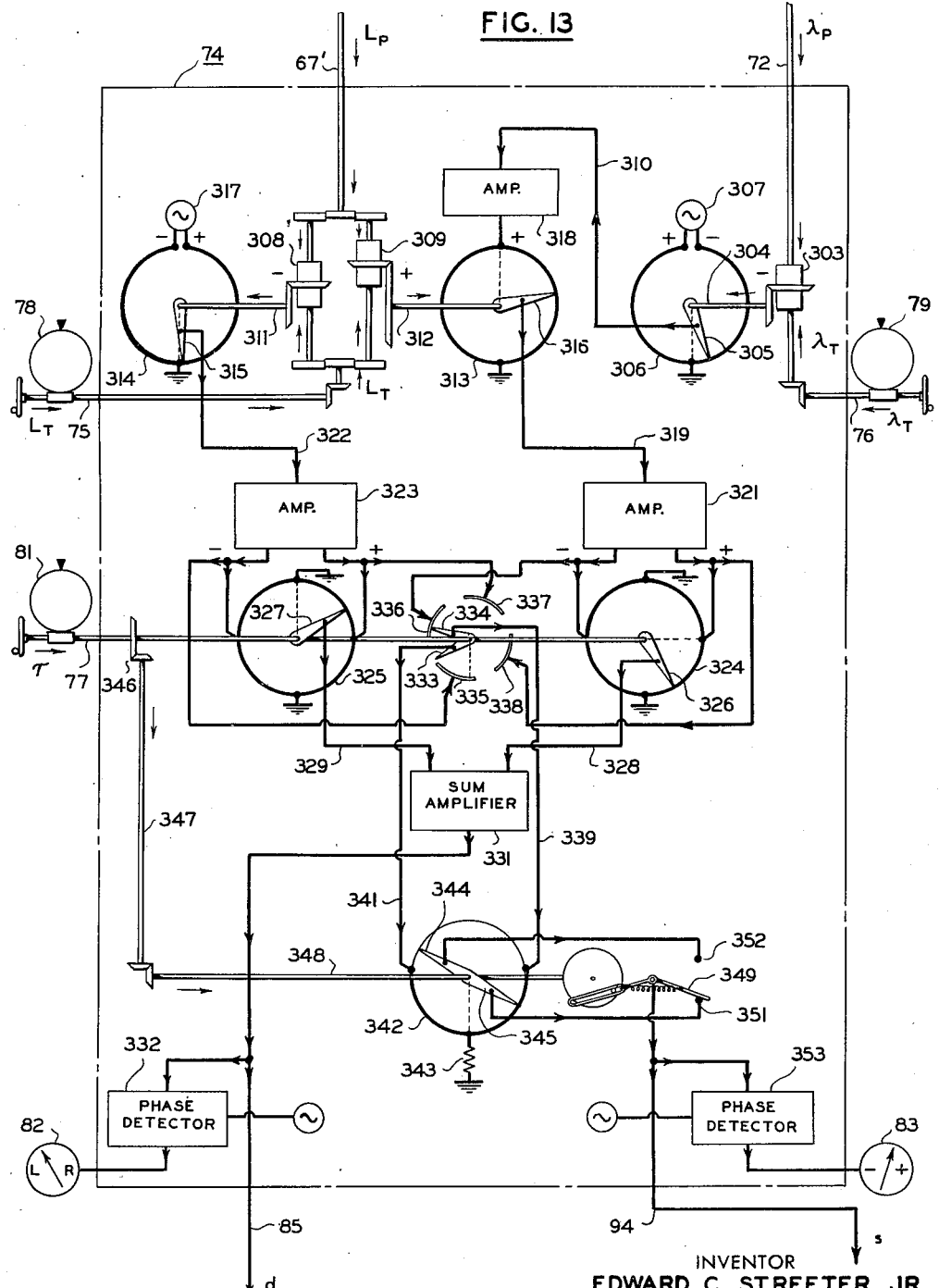
Figure 14:
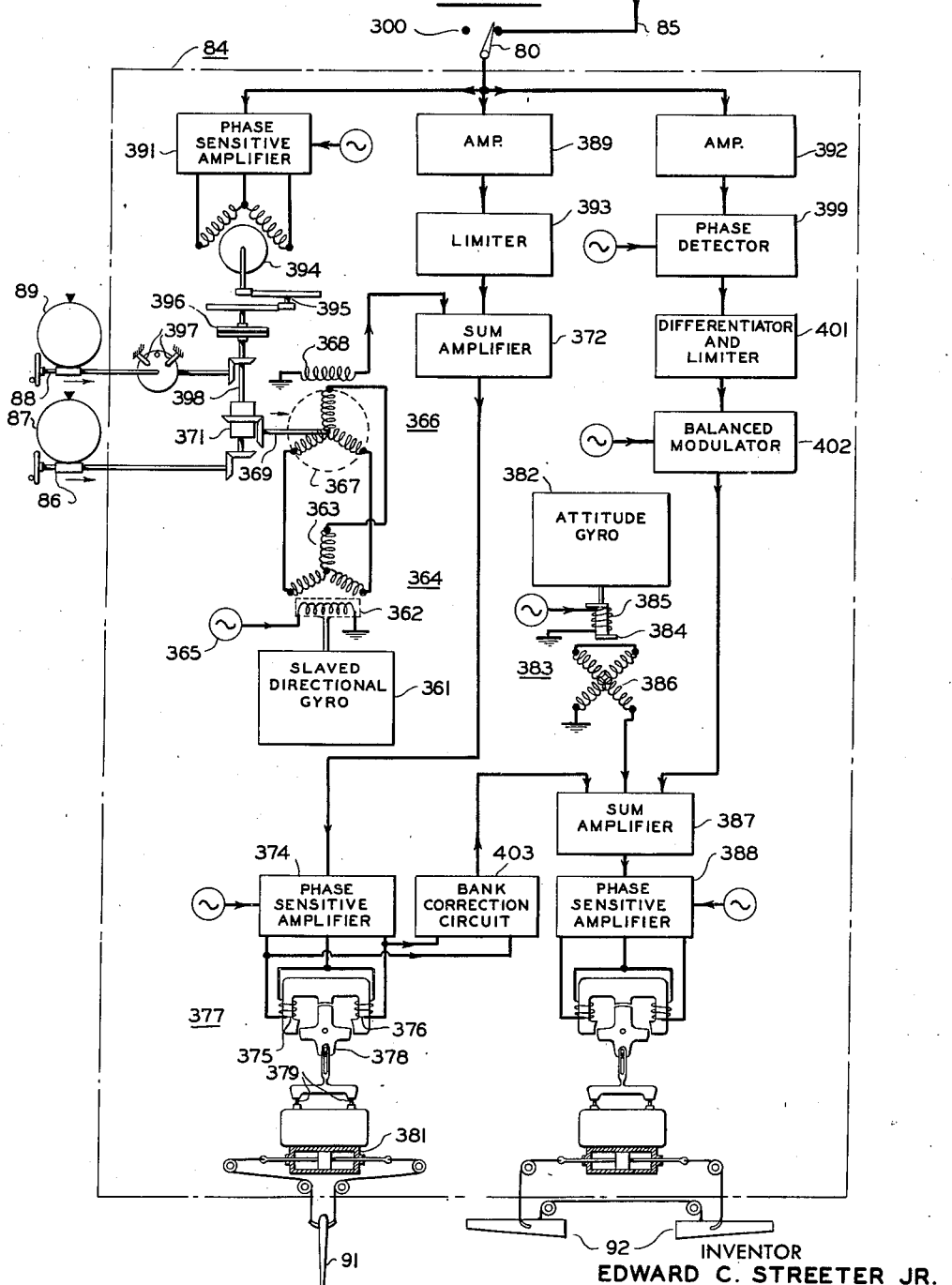

Fig. 10 is a block diagram of means for determining distance differences $k_A$ and $k_B$ of a craft from three fixed points;

Fig. 11 is a block diagram of means for determining the bearing $\phi_a$ of a craft from a fixed point O;

Fig. 12 is a block diagram of means for determining the distance $r$ of a craft from a fixed point O and the latitude $L_P$ and longitude $\lambda_P$ of said craft;

Fig. 13 is a block diagram of means for determining the displacement $d$ of a craft from a desired ground track $S$ and distance $s$ from a desired objective $T$;

Fig. 14 is a block diagram of course control means; and

Fig. 15 is a block diagram of means for determining the ground speed of a craft.

Similar characters of reference are used in all the above figures to indicate corresponding parts. Arrows are provided in Figs. 9–15 to indicate the direction of control or energy flow.

The principal symbols employed throughout the specification and on the drawings are collected and defined in the following list for the purpose of convenient reference and as an aid to the clear understanding of the description.

*Notation*

Angles generated by clockwise rotation are considered positive.

A=known position of radio transmitter "A."
B=known position of radio transmitter "B."
O=known position of radio transmitter "O."
P=unknown position of mobile craft.
T=known position of objective.
S=desired rhumb line ground track passing through T with a given positive sense.
$a$=known arc of great circle between O and A.

$b$ = known arc of great circle between O and B.
$r$ = unknown arc of great circle between O and P.
$r_A$ = unknown arc of great circle between A and P.
$r_B$ = unknown arc of great circle between B and P.
$k_A \equiv r_A - r$ = observed arc difference between $r_A$ and $r$.
$k_B \equiv r_B - r$ = observed arc difference between $r_B$ and $r$.
$x_A$, $x_B$, $x_P$, and $x_T$ = linear distance east (positive) or west (negative) of A, B, P, and T, respectively, with reference to O.
$y_A$, $y_B$, $y_P$, and $y_T$ = linear distance north (positive) or south (negative) of A, B, P, and T, respectively, with reference to O.
$\overrightarrow{OP}$, $\overrightarrow{AP}$, and $\overrightarrow{BP}$ = vector distance of O, A, and B, respectively, to P.
$\phi$ = known angle included between arcs $a$ and $b$ measured clockwise from $a$.
$\phi_a$ = unknown angle included between arcs $a$ and $r$ measured clockwise from $a$.
$L_O$, $L_P$, and $L_T$ = latitude of O, P, and T, respectively, where north latitudes are considered positive and south latitudes negative.
$\lambda_O$, $\lambda_P$, and $\lambda_T$ = longitude of O, P, and T, respectively, where east longitudes are considered positive and west longitudes negative.
$l \equiv L_P - L_O$ = algebraic difference between the latitudes of P and O.
$DL_O \equiv \lambda_P - \lambda_O$ = algebraic difference between the longitudes of P and O.
$p$ = departure or arc between the meridians $\lambda_P$ and $\lambda_O$ as measured along the parallel $L_P$ where $p$ is positive when P is east of O and negative when P is west of O.
$\theta$ = angle as measured at O in a clockwise direction from true north to the arc $a$.
$T$ = angle as measured at T in a clockwise direction from true north to the portion of S directed away from T.
$q$ = proportionality constant relating angular and linear measurement on the surface of the earth.
$d$ = linear displacement or the perpendicular distance of P with respect to the ground track S where displacements to the right of a viewpoint on S looking along the ground track in a positive sense are considered positive and to the left negative.
$s$ = distance of P to T where distances measured ahead are considered positive and behind negative.
$\epsilon$ = error signal applied to a servo system employed to solve an equation.
$\alpha$ = drift angle, that is, the angle between the ground track S and the necessary heading of the craft to enable the same to follow this ground track.
$n$ = proportionality constant such that the product of $n$ and the sine of the limiting magnitude of an arc is equal to unity.
$+$ = positive sign when associated on the drawings with an amplifier indicates that there is no phase reversal between the input and output circuits and when associated with a mechanical differential indicates that the output rotation is proportional to the algebraic sum of the input rotations.
$-$ = negative sign when associated on the drawings with an amplifier indicates that there is a phase reversal between the input and output circuits and when associated with a mechanical differential indicates that the output rotation is proportional to the algebraic difference between the input rotations.

Graphical problem

In accordance with one form of the present invention, means are provided on a mobile craft situated at some unknown position indicated by a point P in Figs. 1 through 5 for receiving signals radiated in predetermined time relationship from three separately spaced radio transmitters having predetermined positions indicated by points O, A, and B, respectively, in Figs. 1 through 5. The time intervals between the arrivals at the craft of the signals from these separate transmitters are automatically measured, and, together with a knowledge of the velocity of propagation of the radio waves and of the initial time relationships of the signals, two independent differences between the distances from the transmitters to the position of the craft are determined.

As is well known, the path of a point that maintains a constant difference between its distances from two fixed points describes a hyperbola. The three transmitters may, therefore, be considered the foci of two independent families of hyperbolas, the transmitter at O being a focus common to both families. Every position of the craft in space is determined by the intersection of a particular hyperbola of each family. In the specific case illustrated in Fig. 1, the difference between the distances from P to B and P to O defines the hyperbola 31 while the difference between the distances from P to A and P to O defines the hyperbola 32. Obviously a map may be constructed showing a plurality of hyperbolas drawn with O and A or O and B as foci and covering the range of values for distance differences in convenient increments. The unknown position P may then be determined by locating the intersection of whatever hyperbolas are defined by the observed distance differences. Having thus found his position, a navigator may determine graphically the direction and distance of his craft from a desired ground track S passing through an objective T. The craft may then be directed according to these determinations. This process, however, must be rapidly and continually repeated to meet changing wind conditions and to ascertain whether the desired ground speed is being maintained. This arduous task is entirely performed by means of the present invention with a precision unobtainable by the most skilled navigator.

Mathematical analysis

Figure 1:
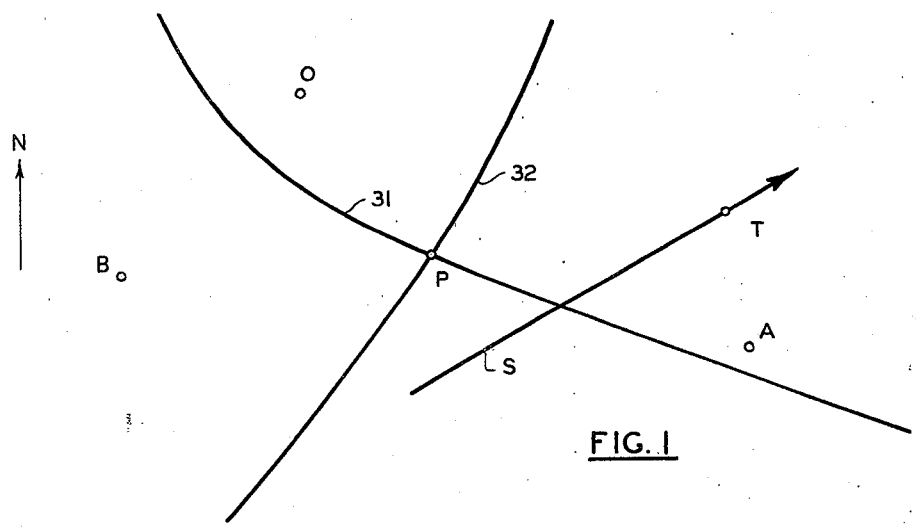
Fig. 1 is a graph illustrating the problem solved by the present invention.
Figure 2:
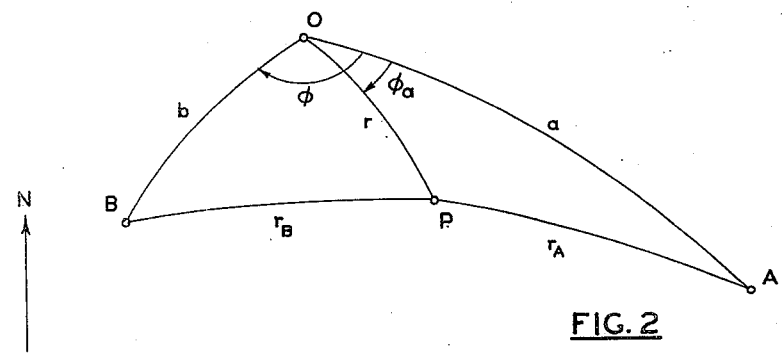
Fig. 2 is a graph illustrating the location of a craft in terms of polar-coordinates $\phi_a$ and $r$.

The present invention solves analytically or vectorially the problem presented graphically by Fig. 1. The first step in the preferred method of solution is illustrated by Fig. 2. Points O, A, B and P are assumed to be on the surface of a spherical earth. Since the shortest distance on the surface of a sphere between any two points on that surface is measured by the lesser arc of a great circle that joins the two points, such arcs may be drawn between the positions of the radio transmitters and the unknown position of the mobile craft. The arcs between O and A and O and B may be labeled $a$ and $b$, respectively, and are readily known since their end points are predetermined. The arcs extending from P to O, A, and B are given reference symbols $r$, $r_A$, and $r_B$, respectively. These arcs are unknown, but the differences in their magnitudes are observed quantities which may be termed $k_A$ and $k_B$ and are defined by the expressions:

$k_A \equiv r_A - r =$ observed arc difference between $r_A$ and $r$ $k_B \equiv r_B - r =$ observed arc difference between $r_B$ and $r$ The constant angle indicated by $\phi$ between arcs $a$ and $b$ is, of course, also known.

The position of P may be established with respect to O by determining the distance $r$ and the angle $\phi_a$ measured between the arcs $a$ and $r$. It will be observed that arcs $a$, $r_A$, and $r$ form an oblique triangle while arcs $b$, $r_B$, and $r$ form an adjacent triangle. The two triangles have the side $r$ in common, and it is this property that enables the problem to be solved.

The law of cosines states that in a spherical triangle the cosine of any side is equal to the product of the cosines of the other two sides plus the product of the sines of these two sides and the cosine of their included angle. Thus, spherical triangle OPB provides the relation, $$\cos r_B = \cos b \cos r + \sin b \sin r \cos (\phi - \phi_a) \quad (1)$$

Similarly spherical triangle OPA gives the equation, $$\cos r_A = \cos a \cos r + \sin a \sin r \cos \phi_a \quad (2)$$

Substituting $k_A + r$ for $r_A$ in Equation 2 and employing the identity for the cosine of the sum of two angles results in $$\cos k_A \cos r - \sin k_A \sin r =$$
$$\cos a \cos r + \sin a \sin r \cos \phi_a \quad (3)$$

Dividing Equation 3 by $\cos r$ and grouping the terms in $\tan r$ gives $$(\sin k_A + \sin a \cos \phi_a) \tan r = \cos k_A - \cos a \quad (4)$$

or $$\tan r = \frac{\cos k_A - \cos a}{\sin k_A + \sin a \cos \phi_a} \quad (5)$$

Upon substituting $k_B + r$ for $r_B$ in Equation 1, one can obtain by a similar process:

$$\tan r = \frac{\cos k_B - \cos b}{\sin k_B + \sin b \cos (\phi - \phi_a)} \quad (6)$$

Equating Equations 5 and 6 and rearranging results in $$(\cos k_A - \cos a) \sin b \cos (\phi - \phi_a) -$$
$$(\cos k_B - \cos b) \sin a \cos \phi_a + (\cos k_A - \cos a)$$
$$\sin k_B - (\cos k_B - \cos b) \sin k_A = 0 \quad (7)$$

Equation 7 is an implicit equation in one unknown quantity of the form:

$$U \cos (\phi - \phi_a) + V \cos \phi_a + W = 0 \quad (8)$$

where U, V, and W are determined by the known locations of the radio stations and by the observed hyperbolic positional data of the craft.

Equation 7 may be readily solved for $\phi_a$ by expressing its terms in the form of physically realizable quantities and employing a suitable servo device to vary the quantity characterizing $\phi_a$. The equation, however, is placed in an equivalent but more convenient form to suit the particular embodiment of the invention illustrated. Since $k_A$, $k_B$, can never be greater than either $a$ and $b$, the base lines, and since $a$ and $b$ never attain values greater than perhaps 20° of earth's arc, or 1200 miles, the factors representing the difference between the cosines of these quantities will remain close to zero. It is helpful to convert these cosine functions to sine functions and then increase the sensitivity of the computing system, as will be hereinafter more fully disclosed, by multiplying the resulting sine functions by a constant $n$ such that these terms vary from zero to unity for the given ranges of $k_A$, $k_B$, $a$ and $b$.

For this purpose the following trigonometric identity may be employed:

$$\cos u - \cos v = -2 \sin \tfrac{1}{2}(u+v) \sin \tfrac{1}{2}(u-v) \quad (9)$$

Expanding Equation 7 with the aid of 9 and multiplying the sine functions by $$\frac{n}{2}$$

results in $$-n \sin \tfrac{1}{2}(k_A+a) n \sin \tfrac{1}{2}(k_A-a) n \sin b \cos (\phi - \phi_a) + n \sin \tfrac{1}{2}(k_B+b) n \sin \tfrac{1}{2}(k_B-b) n \sin a \cos \phi_a - n \sin \tfrac{1}{2}(k_A+a) n \sin \tfrac{1}{2}(k_A-a) n \sin k_B + n \sin \tfrac{1}{2}(k_B+b) n \sin \tfrac{1}{2}(k_B-b) n \sin k_A = 0 \quad (10)$$

Following the same reasoning as above, Equation 5 may be rewritten as $$+ (n \sin k_A + n \sin a \cos \phi_a) \frac{n}{2} \tan r +$$
$$n \sin \tfrac{1}{2}(k_A+a) n \sin \tfrac{1}{2}(k_A-a) = 0 \quad (11)$$

and Equation 6 may be rewritten as $$+ (n \sin k_B + n \sin b \cos (\phi - \phi_a)) \frac{n}{2} \tan r +$$
$$n \sin \tfrac{1}{2}(k_B+b) n \sin \tfrac{1}{2}(k_B-b) = 0 \quad (12)$$

In order to avoid unnecessary duplication in the computing apparatus, Equation 10 may be rearranged as follows:

$$+ n \sin \tfrac{1}{2}(k_A+a) n \sin \tfrac{1}{2}(k_A-a) n \sin b \cos (\phi - \phi_a) - (n \sin k_A + n \sin a \cos \phi_a) (n \sin \tfrac{1}{2}(k_B+b) n \sin \tfrac{1}{2}(k_B-b)) + n \sin \tfrac{1}{2}(k_A+a) n \sin \tfrac{1}{2}(k_A-a) n \sin k_B = 0 \quad (13)$$

or alternatively $$+ n \sin \tfrac{1}{2}(k_B+b) n \sin \tfrac{1}{2}(k_B-b) n \sin a \cos \phi_a - (n \sin k_B + n \sin b \cos (\phi - \phi_a)) (n \sin \tfrac{1}{2}(k_A+a) n \sin \tfrac{1}{2}(k_A-a)) + n \sin \tfrac{1}{2}(k_B+b) n \sin \tfrac{1}{2}(k_B-b) n \sin k_A = 0 \quad (14)$$

It is seen that in the process of solving Equation 13 for $\phi_a$, factors are obtained which may be employed in the subsequent solution of Equation 11 for $r$. Likewise, the particular form of the Equation 14 provides factors for the solution of Equation 12. In the illustrated embodiment of the invention switching means are provided for enabling either the combination of Equations 13 and 11 or the pair of Equations 14 and 12 to be utilized, as desired, for calculating first $\phi_a$ and then $r$.

It is well to point out that the above spherical trigonometric equations have general utility since they are equally as accurate for line of sight distances as for long ranges. At such short distances it is readily apparent that the sine and tangent terms are substantially equal to their arcs in radians, and under these conditions Equation 10 may be rewritten as $$(a^2 - k_A^2) b \cos (\phi - \phi_a) - (b^2 - k_B^2) a \cos \phi_a + (a^2 - k_A^2) k_B - (b^2 - k_B^2) k_A = 0 \quad (15)$$

and Equations 5 and 6 become $$r = \frac{a^2 - k_A^2}{2(k_A + a \cos \phi_a)} \quad (16)$$

and $$r = \frac{b^2 - k_B^2}{2(k_B + b \cos (\phi - \phi_a))} \quad (17)$$

respectively. Equations 15, 16, and 17 are identical to those equations that would have been derived if the problem had been initially considered in the more limited terms of plane trigonometry, an analysis inapplicable to appreciable areas of the earth's surface.

The knowledge of $\phi_a$ and $r$ fixes the position of the craft at P. However, the location of P by these polar coordinates is not easily interpreted and does not provide positional data in a form convenient for control purposes. What is required is a knowledge of the craft's position with respect to general space coordinates independent of the particular location of the radio transmitter O.

Figure 3:
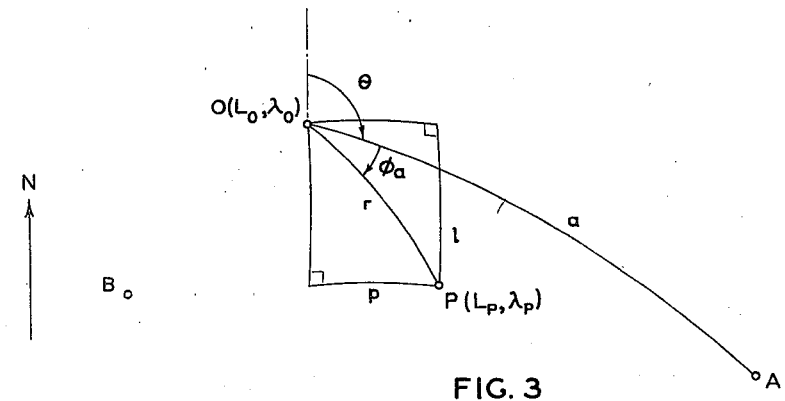
Fig. 3 is a graph illustrating the location of a craft in terms of latitude $L_P$ and longitude $\lambda_P$.

It seems that the most satisfactory method of determining P is in terms of latitude and longitude, and the manner of determining these geographical coordinates from the known data is illustrated in Fig. 3. In Fig. 3 the parallel of latitude $L_O$ is drawn from O to an intersection with the meridian $\lambda_P$ passing through P. The parallel $L_O$, meridian $\lambda_P$, and arc $r$ form a right spherical triangle. In a similar manner the parallel of latitude $L_P$ is drawn from P to an intersection with the meridian $\lambda_O$ passing through O. The parallel $L_P$, the meridian $\lambda_O$, and the arc $r$ form another right spherical triangle. The algebraic difference between the latitudes of P and O is denoted 1 and is illustrated by the length of the arc between P and the intersection of the parallel $L_O$ with the meridian $\lambda_P$. The departure or arc between the meridians $\lambda_P$ and $\lambda_O$ as measured along the parallel $L_P$ is designated by the symbol $p$. The angle as measured at O in a clockwise direction from true north to the arc $a$ is a known value denoted by $\theta$.

The law of sines states that in a spherical triangle the sines of the sides are proportional to the sines of the opposite angles. Since 1 is a side of a right triangle having $r$ as the hypotenuse, one may write:

$$\frac{-\sin 1}{\sin (\theta + \phi_a - 90°)} = \sin r \quad (18)$$

Since $\sin (\theta + \phi_a - 90°) = -\cos (\theta + \phi_a)$ and $1 \equiv L_P - L_O$, Equation 18 may be rewritten as $$-n \sin (L_P - L_O) + n \sin r \cos (\theta + \phi_a) = 0 \quad (19)$$

Equation 19 may be readily solved for the craft's latitude $L_P$.

Now $p$ forms a side of the other right spherical triangle also having $r$ as the hypotenuse, and therefore one may state:

$$\frac{\sin p}{\sin (\theta + \phi_a)} = \sin r \quad (20)$$

Furthermore, $p$ forms the base of an isosceles right spherical triangle having the north pole at the vertex, $DL_O \equiv \lambda_P - \lambda_O$ for the vertex angle, and $90° - L_P$ for the sides. Thus, one may state in addition that $$\frac{\sin p}{\sin DL_O} = \cos L_P \quad (21)$$

Eliminating $\sin p$ in Equation 20 by employing Equation 21, and rearranging the result gives $$-\cos L_P n \sin (\lambda_P - \lambda_O) + n \sin r \sin (\theta + \phi_a) = 0 \quad (22)$$

Equation 22 may be readily solved for the craft's longitude $\lambda_P$.

Equations 19 and 22 may be somewhat simplified by replacing the sines of the arcs by the arcs themselves when the latter are small or when a plane trigonometric solution is satisfactory and the greater accuracy of a spherical trigonometric solution does not justify the greater cost of the non-linear components required by a spherical triangle computer.

The knowledge of the craft's latitude $L_P$ and longitude $\lambda_P$ is of immense importance. However, it is desirable to know the perpendicular displacement $d$ of the craft from the desired ground track S and the distance $s$ from the desired objective T. The geometry of this further problem is illustrated in Fig. 4 where the latitude and longitude of T are denoted by $L_T$ and $\lambda_T$, respectively, and the orientation of the ground track S is indicated by the angle $\tau$ as measured at T in a clockwise direction from true north to the portion of S directed away from T. A rhumb line, that is, a line that crosses successive meridians at a constant angle, is a satisfactory ground track S, since the craft at P is never more than a few hundred miles from its immediate objective T. The choice of a rhumb line ground track enables the problem to be considered in terms of plane triangles without disturbing the accuracy of the results. If P is given rectangular coordinates $x_P$ and $y_P$ and T is defined by coordinates $x_T$ and $y_T$, then lines 33 and 34 represent linear distances $x_P - x_T$ and $y_P - y_T$, respectively. Analytical geometry provides the following expression for the distance $d$ of a point $x_P$, $y_P$ from a straight line passing through a point $x_T$, $y_T$ at an angle $\tau$:

$$d = (x_P - x_T) \cos \tau - (y_P - y_T) \sin \tau \quad (23)$$

It may be correctly assumed here that the departure between two places, that is, distance east or west, is substantially equal to the departure between their meridians as measured in the middle latitude of the places. Thus, the length of line 33 is $$x_P - x_T = q(\lambda_P - \lambda_T) \cos\left(\frac{L_P + L_T}{2}\right) \quad (24)$$

and the length of line 34 is $$y_P - y_T = q(L_P - L_T) \quad (25)$$

where $q$ is a proportionality constant relating angular and linear measurement on the surface of the earth. Substituting the above Equations 24 and 25 in Equation 23, there results:

$$d = q(\lambda_P - \lambda_T) \cos\left(\frac{L_P + L_T}{2}\right) \cos \tau - q(L_P - L_T) \sin \tau \quad (26)$$

It will be noted that no servo device is required to evaluate $d$. The knowledge of the displacement $d$ is employed, as is hereinafter disclosed in detail, to maintain the craft on the ground track S with the aid of a well-known automatic pilot.

The distance $s$ may, for the sake of simplicity, be computed as measured along the ground track S since the displacement vanishes under conditions of equilibrium. The assumption that $s$ lies along S results in the following simple equations:

$$s = -(x_P - x_T) \csc \tau \quad (27)$$

or $$s = -(y_P - y_T) \sec \tau \quad (28)$$

The knowledge of the distance $s$ is employed, as is hereinafter disclosed in detail, to compute the average ground speed of the craft or to enable the ground speed to be maintained at a predetermined value.

Although the above analysis is presented in some detail because a system based upon it is extremely versatile and accurate, nevertheless, there are many variations and alternate methods of solution that are embraced by the present invention. For example, one may eliminate the steps of solving for the craft's latitude and longitude, if desired, and pass from the polar solution of the craft's position in terms of $\phi_a$ and $r$ directly to the computation of the distance $s$ and displacement $d$. However, only slight reduction in the complexity of the computer is attained by this change. The fixed quantities which must be introduced into the system are not as readily ascertained as in the illustrated embodiment nor are the operations of the necessary servo mechanisms as easily monitored as when $L_P$ and $\lambda_P$ are calculated. Vector analysis may be employed where the more rigorous spherical trigonometric analysis is unnecessarily accurate.

One form of vector analysis is discussed to illustrate the scope and varied aspects of the present invention. Referring now to Fig. 4, let O be considered at the origin of a rectangular coordinate system. Points A, B, and P are defined by abscissas $x_A$, $x_B$, and $x_P$, respectively, and by ordinates of $y_A$, $y_B$, and $y_P$, respectively. Lines 35, 36, and 37 represent the vector distances $$\overrightarrow{OP}, \overrightarrow{AP}, \text{ and } \overrightarrow{BP}$$

respectively. The assumption is made that $qk_A$ and $qk_B$ are substantially equal to the differences between the absolute magnitudes of the vector distances $$\overrightarrow{AP} \text{ and } \overrightarrow{OP}$$

and between $$\overrightarrow{BP} \text{ and } \overrightarrow{OP}$$

respectively. Expressing these relations in equation form gives $$qk_A = |\overrightarrow{AP}| - |\overrightarrow{OP}| \quad (29)$$

and $$qk_B = |\overrightarrow{BP}| - |\overrightarrow{OP}| \quad (30)$$

Equations 29 and 30 may be rewritten in terms of differences in the absolute magnitudes of complex quantities representing the vector distances by employing the familiar operator $j$ to indicate the quadrature relationship between the coordinate axes. The resulting equations are $$qk_A = |(x_P - x_A) + j(y_P - y_A)| - |x_P + jy_P| \quad (31)$$

and $$qk_B = |(x_P - x_B) + j(y_P - y_B)| - |x_P + jy_P| \quad (32)$$

The left sides of the Equations 31 and 32 may be characterized by direct voltages proportional to the observed distance differences while the right sides of the equations are formed with the aid of assumed coordinates of the unknown position of the craft in the following manner. The $X$ and $jY$ coordinates are conveniently represented by alternating voltages 90° apart in phase. Voltages proportional to the quantities $x_A$, $jy_A$ and $x_B$, $jy_B$ are supplied by attenuators or voltage dividers manually set to the known coordinates of A and B, respectively, while voltages proportional to the unknown variables $x_P$ and $jy_P$ are provided by similar means adjusted by servo mechanisms that are actuated by the difference between the known and calculated sides of Equations 31 and 32. The portions of the equations within the absolute magnitude signs may be built up from the above six elemental alternating voltages by carrying out the indicated additions and subtractions in simple and stable electronic circuits. The resultant voltages, proportional to $$(x_P - x_A) + j(y_P - y_A), (x_P - x_B) + j(y_P - y_B)$$

and $x_P + jy_P$, are rectified to obtain the absolute magnitudes of these quantities. The third rectified voltage is subtracted from the first and the second rectified voltages to give the right sides of Equations 31 and 32, respectively. The observed distance differences on the left sides of the equations are compared as to magnitude with the calculated differences on right sides of these equations, and the resulting voltage inequalities are employed to control the servo devices that adjust $x_P$ and $jy_P$. The servo mechanisms alter the unknown variables until the control voltages become zero at which point the coordinates of the craft with respect to station O have assumed correct values. It seems evident that the objective T may be characterized by alternating voltages proportional to $x_T$ and $jy_T$ and distance $s$ and displacement $d$ may be readily computed from the vector relationships.

Vectorial methods of position finding of the type discussed in the foregoing paragraphs have the advantage of great simplicity, but the flat earth assumption upon which they are based is not sufficiently valid at distances beyond, say, a hundred miles, to enable full use to be made of the accuracy available in the incoming signals. Therefore, the particular apparatus chosen for illustration performs analytical rather than vectorial calculations in carrying out the objects of the present invention.

*Particular embodiment of invention*

A particular embodiment of the invention is shown in Fig. 9, wherein a wave collector 41, symbolized by an antenna, is responsive to signals received from the three radio stations O, A, and B shown in Figs. 1–5. If the wave collector is mounted on a mobile craft at the position P, the signals are transmitted in predetermined time relationship directly from these stations, whereas if the wave collector is permanently situated say at O, then signals are transmitted from the craft, received at the radio stations, and relayed to the wave collector 41, by wire connection if desired. The signals may be in the form of pulses, continuous waves, or any type of modulated wave. The signals as received by wave collector 41 have certain predetermined phase or time relationships dependent upon apparatus design considerations and the fixed geometry of the stations and also phase or time displacements caused by the difference between the distances from the mobile craft to the stations.

A distance difference computer 42 is supplied by the wave collector 41. Computer 42, one form of which is illustrated in Fig. 10, is adapted to separate the incoming signals on the basis of their particular carrier frequency, pulse repetition rate, or other identifying characteristic. When separated the intelligence bearing portions of the signals from station O are compared as to phase with similar waves from stations A and B and shafts 43 and 44 are caused to rotate in proportion to the observed distance differences $k_A$ and $k_B$, respectively. Calibrated dials 45 and 46 geared to shafts 43 and 44, respectively, indicate values which define the craft's position P in hyperbolic coordinates as illustrated by Fig. 1.

An angle $\phi_a$ computer 47, one form of which is shown in Fig. 11, is continuously supplied with the instantaneous values of $k_A$ and $k_B$ in terms of the angular positions of shafts 43 and 44, respectively. Manually adjustable shafts 48, 49 and 51 are provided for initially setting into the computer 47 those rotations corresponding to the known positional data of stations O, A, and B necessary to constitute either Equation 13 or Equation 14, discussed above, in which $\phi_a$ is the only unknown. Thus shafts 48, 49 and 51 are adjusted so that their accompanying dials 53, 52, and 54, respectively, read arc $a$, arc $b$, and angle $\phi$, respectively. These constants have been illustrated in Fig. 2. A shaft 55 is actuated by servo means operative in response to errors in the particular equation employed. A dial 56 geared to shaft 55 indicates the angle $\phi_a$ which is the continuous solution of the Equation 13 or 14. Angle $\phi_a$ is a measure of the absolute direction of the craft from the radio station O. This information enables a pilot to follow any desired great circle track to O by merely choosing the appropriate value of $\phi_a$ and then steering the craft in such a manner as to maintain this angle constant. It is to be noted that this maneuver is accomplished without any necessity for the knowledge of either the direction of arrival of the radio waves from O or the orientation of the craft. The portion of the system thus far disclosed may, therefore, often be utilized quite apart from the remaining structure. The addition of each further device, however, contributes to the scope and versatility of the system.

A computer 57, one form of which is illustrated and discussed with reference to Fig. 12, is supplied with the value of $\phi_a$ from the device 47 in terms of the angular position of shaft 55. Leads 58 and 59 from computer 47 are employed to introduce factors in the form of voltages evaluated in the calculation of $\phi_a$. These factors enable either Equation 11 or Equation 12 to be constituted according to whether Equations 13 or 14, respectively, have previously been employed in the calculation of $\phi_a$. Equations 11 and 12 contain only $r$ as an unknown variable, and servo means are provided in computer 57 for solving these equations. A dial 61, driven by a shaft 62 connected with the servo device, continuously indicates the value of the arc $r$. The indication of $r$ is particularly useful when the craft is travelling along a great circle track toward or away from the point O. It is to be remembered that each group of stations utilized by the system provides three homing points since the position of any station may be chosen as the point O merely by altering the constants set into the computers 47 and 59 and the tuning of computer 42.

Shafts 63 and 64 are provided for manually setting into the computer 57 rotations proportional to the known latitude $L_O$ and angle $\theta$, respectively, as indicated by calibrated dials 65 and 66, respectively. The introduction of $L_O$ and $\theta$ together with the continuously evolved values of $\phi_a$ and $r$ enables the Equation 19 to be constituted, in which the only unknown quantity is the craft's latitude $L_P$. Servo means are employed to solve this equation, and a shaft 67 is rotated thereby in proportion to $L_P$ and a dial 68 geared to this shaft conveniently indicates this quantity.

The known longitude $\lambda_O$ is inserted into computer 57 by a shaft 69 adjusted according to the indication of a calibrated dial 71. The knowledge of $\phi_a$, $r$, $L_P$, and $\lambda_O$ provides the requisite information to enable computer 57 to constitute Equation 22, in which only the craft's longitude $\lambda_P$ is unknown. A servo device solves this equation and actuates a shaft 72 in proportion to the longitude $\lambda_P$, whose magnitude is continuously indicated by a dial 73 geared to the shaft 72. The indication of the craft's latitude and longitude provides a continuous knowledge of the craft's position in the most universal and understandable form. The accuracy and reliability of computers 47 and 57 may be periodically verified by comparing on a suitable map the intersection of the hyperbolic coordinates $k_A$ and $k_B$ with the intersection of the geographical coordinates $L_P$ and $\lambda_P$. The ability to monitor a large portion of the system is a distinct practical advantage. It is evident that by maintaining the latitude or longitude indication constant the craft may be made to travel along a parallel or a meridian, respectively. It is, however, desirable to have complete freedom in the choice of ground track for which reason the following means are provided.

A computer 74, one form of which is illustrated and discussed with reference to Fig. 13, is supplied with the values of $L_P$ and $\lambda_P$ in terms of the angular positions of shafts 67 and 72, respectively. Manually adjustable shafts 75, 76 and 77 are provided for initially setting into computer 74 rotations defining the desired ground track S. Shafts 75, 76 and 77 are adjusted so that their accompanying calibrated dials 78, 79 and 81 read $L_T$, $\lambda_T$ and $\tau$, respectively. These constants have been illustrated in Fig. 4. The knowledge of $L_T$, $\lambda_T$ and $\tau$, together with the values of $L_P$ and $\lambda_P$, provides the requisite information for constituting Equation 26, in which only the displacement $d$ of the craft from S is unknown.

The value of $d$ is obtained in terms of an electrical voltage and is indicated by a zero-center meter 82. This meter may be utilized in the manner of the familiar right-left meter, well known in the radio compass and aircraft instrument landing art. This meter reveals any displacement of the craft from the ground track S in both sense and magnitude.

Factors evolved in the calculation of $d$ are employed to constitute either Equation 27 or 28 according to the value of $\tau$. These equations contain only the distance $s$ of the craft from T as an unknown quantity. The magnitude of $s$ is expressed in terms of voltage and is indicated by a zero-center meter 83. This meter provides a reading of the distance from the craft to the desired objective and, furthermore, indicates the sense of this distance, that is, whether the objective lies ahead or behind the position of the craft.

A course control device 84, one form of which is illustrated and discussed with reference to Fig. 14, is provided with an automatic gyroscopic pilot device for maintaining the craft stabilized upon a predetermined heading, which is introduced to the control device 84 by means of a manually adjustable shaft 86 set to the angle $\tau$, as indicated by a calibrated dial 87. Means are also provided in the form of a manually adjustable shaft 88 and geared indicating dial 89 for initially introducing, if known, the craft's approximate drift angle with respect to the desired ground track to modify the heading $\tau$ predetermined by shaft 86. The course control 84 further operates to adjust the heading of the craft in accordance with the displacement signal $d$ introduced over a lead 85 from the computer 74 to direct the craft back to the desired ground track and simultaneously to alter the approximate drift angle of the craft in response to the time integral or average value of the displacement signal, in order to establish the correct drift angle α. The craft is thus caused to turn toward the direction of the wind an amount just sufficient to compensate for the effect of the particular cross wind present. The craft's controls, actuated by course control 84, are symbolized by an aircraft rudder 91 and ailerons 92.

A ground speed computer 93 is supplied through a lead 94 from the computer 74 with a voltage proportional to the distance s. The computer 93 is provided with a motive device that produces a motion proportional to an assumed distance s, whose value is indicated on a dial 95. The assumed magnitude of s is initially made equal to the actual magnitude of s, as provided from computer 74, by the differential operation of a displacement shaft 96 which is manually adjusted so that a lead-lag meter 97 indicates coincident values of s. A rate shaft 98 is manually turned so that its accompanying dial 99 reads the ground speed desired for the craft. The speed of the motive device that produces the assumed value of s is controlled by the shaft 98; consequently the assumed distance is altered at a rate proportional to the desired ground speed. If the actual value of s does not alter in like manner, a shaft 101 is actuated by servo means in accordance with the difference between the two rates of variation. The shaft 101 in turn operates a speed control 102, which may be a throttle, a brake, flaps, or the like, in such manner that the craft's speed is controlled to provide an actual time rate of change of distance to the desired objective that corresponds with the desired ground speed.

In an alternative mode of operation the speed control 102 is disconnected and the assumed value of s is made to follow the actual value by actuating shaft 98 from the servo means with the result that the dial 99 indicates the actual ground speed rather than the desired ground speed.

A manually adjustable shaft 103 is adapted to introduce into the computer 93 a rotation proportional to a reference distance from the desired objective by setting accompanying dial 104 to the appropriate point. Upon the arrival of the craft at the position corresponding to this particular distance, a signal is adapted to be transmitted over a lead 105 to a control device 106. This signal indicates the fulfillment of a particular navigational problem, and controlled device 106 is adapted either to provide a warning indication to the navigator, to disconnect a portion or the entirety of the computing and control system, or to release a bomb load according to the significance attached to the solution of this problem.

*Discussion of Fig. 10*

Fig. 10 illustrates a particular form of the distance difference computer 42 designed, in this case, to abstract information from amplitude-modulated radio waves transmitted on different carrier frequencies from each of the radio stations O, A, and B. These different carrier waves are similarly modulated by two common signal frequencies. The period of the longer signal wave is at least equal to the time required for radiation to travel as far as the maximum contemplated range of the position-finding system, while the shorter signal wave has a periodicity that is some convenient multiple of the longer wave. The phase relationships between the signals radiated from the stations are maintained constant by synchronizing all the modulation frequencies by means of wire or radio intercommunication links. The radio frequency waves, as collected by antenna 41, are supplied to receiver 107 which responds to the carrier frequency of station B and detects its associated modulation, to receiver 108 which responds to the carrier wave transmitted by station O and detects its modulation frequencies, and also to receiver 109 which is in turn responsive to the radio frequency from station A and reproduces its modulation envelope.

The two audio frequencies produced by receiver 107 are separated by band pass filters 111 and 112. In like manner, the corresponding signals from the receiver 108 and 109 have their low frequencies transmitted by band pass filters 113 and 114, respectively, and their higher audio frequencies transmitted by band pass filters 115 and 116, respectively. The low audio frequency outputs from band pass filters 111 and 114 are introduced into linear phase shifters 117 and 118, respectively. The phase shifted outputs of devices 117 and 118 are amplified in amplifiers 119 and 121, respectively, and supply one input of phase meters 122 and 123, respectively.

The low audio frequency, transmitted by band pass filter 113 and derived from station O, is amplified by an amplifier 124 without any intermediate phase shifting. The output of amplifier 124 provides a reference input for phase meters 122 and 123. These phase meters are each adapted to provide a direct voltage that is proportional to the phase difference between the two inputs, and whose polarity reverses as the phase changes from lagging to leading. A meter of this general type has been disclosed by James E. Shepherd in U. S. Application No. 375,373, Patent 2,370,692 issued March 6, 1945, entitled "Phase angle indicator" and filed January 22, 1941.

In a similar manner the high frequency audio waves transmitted by band pass filters 112 and 116 are phase shifted by devices 125 and 126, respectively, similar to phase shifters 117 and 118. Phase shifters 125 and 126 are connected by gearing 127 and 128, respectively, to phase shifters 117 and 118, respectively, in such a ratio that the higher frequency waves are shifted at n times the rate of the lower frequency waves, where n is the frequency multiple relating the higher to the lower waves. Under these conditions the time delays introduced by either phase shifters 125 and 117 or 126 and 118 in their respective waves are equal.

The outputs of phase shifters 125 and 126 are supplied through amplifiers 129 and 131, respectively, to phase meters 132 and 133, respectively, similar to devices 122 and 123. The output of band pass filter 115 is amplified by an amplifier 134 and applied to reference inputs of meters 132 and 133 without any intermediate phase shifting. The direct voltage reversible polarity outputs of phase meters 122 and 132 are suitably amplified and limited by devices 135 and 136, respectively, and combined in a summing amplifier 137. The summing amplifier 137 serves as a signal source for a balanced modulator 138, which acts to convert the impressed direct voltage to an alternating voltage convenient for controlling a servo device. A phase sensitive amplifier 139 is responsive to the output of the balanced modulator 138 and actuates a motor 141. The motor 141, acting through reduction gearing 142 and shafts 143 and 44, controls the position of phase shifters 117 and 125. In a similar manner, the outputs of phase meters 123 and 133 are passed through amplifier limiters 144 and 145, respectively, and added in summing amplifier 146. The output of summing amplifier 146 is impressed on the signal input of a balanced modulator 147 whose alternating voltage output actuates a motor 149 as controlled by phase sensitive amplifier 148. The motor 149 drives through reduction gearing 151 and shafts 152 and 43 to position phase shifters 118 and 126.

In the operation of the computer 42 illustrated in Fig. 10, any difference in the distance $s$ between the craft and stations O and B introduces spatial phase shifts between the modulation frequencies from these stations. If phase shifters 117 and 125 are not positioned so as to correct these phase shifts, the phase meters 122 and 132 produce outputs proportional to the residual phase differences. The output of phase meter 122 roughly and unambigously determine this phase shift, while the output of phase meter 132 indicates the phase shift as determined with reference to the nearest coincident phase relationship of the higher audio frequency waves. The limiting of amplifiers 135 and 136 is such that the output of phase meter 122 predominates over the output of phase meter 132 except close to coincident phase relationship of the low frequencies, under which conditions phase meter 132 has substantially full control. Thus the output of meter 132 serves to provide the final sensitive control of the motor 141.

Phase shifters 117 and 125 are actuated by motor 141 as long as there is any combined output from sum amplifier 137. At equilibrium devices 117 and 125 introduce phase shifts in the frequencies they transmit equal to the phase shifts introduced by the difference $k_B$ in the distances between the craft and stations O and B. The position of the shaft 44 is therefore at all times directly proportional to the distance difference $k_B$ which it is desired to measure. In a similar manner shaft 43 is positioned according to the difference $k_A$ in the distances between the craft and stations O and A in the process of balancing the phase shifts produced in devices 118 and 126 against the spatially introduced phase shifts.

*Discussion of Fig. 11*

Referring now to Fig. 11, the particular embodiment of the computer 47 chosen for illustration is an electromechanical calculator that employs electricity as a medium in which the intangible mathematical operations indicated by Equations 13 or 14 are given objective form. The mechanism for making calculations is to provide a servo device with means for comparing the attenuations of a plurality of electrical transmission paths and means for adjusting at least one attenuation to produce a null balance.

The electrical transmission paths comprise a plurality of interconnected voltage dividers 155—159; 161—165, some initially set according to known constant factors, others continuously adjusted according to known variable factors, and several connected to the servo device. These voltage dividers each act to multiply two quantities together, where one quantity is expressed as a voltage and the other is expressed in mechanical form. The factor proportional to the voltage is impressed across the voltage divider while the mechanical factor is the motion that moves the contact arm. The voltage measured at the contact is proportional to the product of the first two factors. The actual voltage on the contact arm is equal to the impressed voltage multiplied by the ratio of the resistance between the point of contact and ground to the total resistance of the voltage divider. The nature of the multiplication, therefore, may be controlled by suitably controlling the resistance of the voltage divider.

The multiplication of an impressed voltage by a function may be accomplished if the resistance is made to vary properly in accordance with this function. The required variation may be obtained by winding wire of constant resistance per unit length upon a card whose width is determined by the mathematical derivative of the desired function. The card is conveniently bent according to the arc of a circle, and the contact arm is rotated about the center, making sliding contact with the even edge of the card. Since multiplication by this method is actually a process of fractionation, it is particularly well suited to the trigonometric functions employed in the present system.

Buffer amplifiers 166—169; 171—175 are provided to enable the output potential of the voltage dividers to be measured without drawing current through the sliding contacts and thus impairing the accuracy of the multiplication. The amplifiers also serve to provide balanced outputs to ground where necessary and to prevent impedance interaction between the various voltage dividers. In Fig. 11 and subsequent figures, plus signs associated with such amplifiers indicate that there is no phase reversal between input and output circuits while minus signs indicate that there is a phase reversal.

The means for comparing attenuations of the transmission paths is a voltage summing amplifier 176 which compares the relative attenuations by algebraically adding the relative voltage amplitudes transmitted by the transmission paths. The servo device is illustrated as a phase sensitive motor 177 which is controlled by the output voltage of the summing amplifier 176 and which generates the dependent variable, in this case the angle $\phi_a$, in mechanical form in the process of seeking a substantially zero control voltage by adjusting the attenuation of two transmission paths. The solution of Equation 13 or 14 is, consequently, indicated by the vanishing of the output voltage from the summing amplifier 176. The means for obtaining the particular functions, mechanical rotations, and interconnections necessary for constituting either Equation 13 or 14 are now discussed in detail.

Shafts 48 and 49, manually rotated in proportion to known arcs $a$ and $b$, respectively, as indicated by calibrated dials 52 and 53, respectively, each supply one of the inputs of mechanical differentials 178 and 179, respectively. Shafts 181 and 182 are also driven through suitable mechanical connections by shafts 48 and 49, respectively. Shafts 181 and 182 rotate electrical contact arms 185 and 186, respectively, on voltage dividers 155 and 156, respectively, and actuate one of the inputs of mechanical differentials 183 and 184, respectively. Dashed radial lines, like reference line 180, are drawn from the centers of all voltage dividers in Fig. 11 and subsequent figures to indicate the zero angle position of the associated contact arms. The physical angle of rotation differs from the mathematical magnitude of arc or angle by a constant multiple such that the product of this proportionality constant and the maximum difference in the mathematical magnitudes of arcs or angles encountered is equal to the total rotational angle physically available on the voltage divider. For example, the arc $a$ denotes the great circle distance between O and A. This arc is always positive and has a value lying somewhere between zero and say 20° of earth's arc (1200 miles). Almost a 360° rotational angle is physically available on the voltage divider 155, and therefore the proportionality constant in this instance may be about 18. Voltage dividers 155 and 156 have resistances that vary according to the product of $n$ and the sine of the mathematical angle of rotation. Thus, a voltage supplied through a lead 213 and impressed across the voltage divider 155 provides a potential as measured at the contact arm 185 that corresponds to the input voltage multiplied by the factor $n \sin a$. Likewise, a voltage supplied through a lead 214 and impressed across the voltage divider 156 is multiplied by the factor $n \sin b$.

Shafts 43 and 44, continuously rotated in accordance with $k_A$ and $k_B$, respectively, drive shafts 187 and 188, respectively, which latter serve to actuate electrical contact arms 189 and 191, respectively, of voltage dividers 162 and 163, respectively. Voltage dividers 162 and 163 have resistances that vary in accordance with the product of $n$ and the sine of the mathematical angle of rotation. The voltage divider 162 is center-tapped to ground and has two balanced inputs supplied in phase opposition through the amplifier 173. The impressed voltage is multiplied by the function $n \sin k_A$ in the voltage divider 162. In like manner voltage divider 163 is also center-tapped to ground and has two balanced inputs supplied in phase opposition by the amplifier 174. The impressed voltage is multiplied by the function $n \sin k_B$ in the voltage divider 163. The balanced inputs for voltage dividers 162 and 163 are necessary since the functions the latter introduce may be positive or negative.

Shafts 192 and 193 are also driven by shafts 43 and 44, respectively. Shafts 192 and 193 provide the second inputs for differentials 178 and 179, respectively, whose output shafts 196 and 198, respectively, are rotated one-half the algebraic sum of the input rotations. Plus or minus signs associated with the output shafts of mechanical differentials in Fig. 11 and subsequent figures indicate that the output rotations are proportional to the algebraic sums or differences, respectively, of the input rotations. Output shafts 196 and 198 turn electrical contact arms 197 and 199, respectively, of the voltage dividers 157 and 158, respectively. Voltage dividers 157 and 158 have resistances that vary in accordance with the product of $n$ and the sine of the mathematical angle of rotation. The voltage impressed over lead 215 on voltage divider 157 is therefore multiplied by the function $n \sin \frac{1}{2}(k_A+a)$ and the voltage supplied over lead 216 and impressed on voltage divider 158 is multiplied by the function $n \sin \frac{1}{2}(k_B+b)$.

Shafts 194 and 195 like shafts 192 and 193, respectively, are geared to shafts 43 and 44, respectively, and supply the second inputs for differentials 183 and 184, respectively. Output shafts 201 and 203 of the differentials 183 and 184, respectively, are rotated one-half the algebraic difference of the input rotations and actuate electrical contact arms 202 and 204, respectively, of the voltage dividers 159 and 161, respectively. Voltage dividers 159 and 161 have resistances which vary in accordance with the product of $n$ and the sine of the mathematical rotational angle. A potential supplied from the amplifier 166 to voltage divider 159 is, consequently, multiplied by the function $n \sin \frac{1}{2}(k_A-a)$ while a voltage from the amplifier 167 impressed across the voltage divider 161 is in like manner multiplied by the function $n \sin \frac{1}{2}(k_B-b)$. Amplifiers 166 and 167 reverse the voltages applied to them in order to take account of the inherently negative values of $n \sin \frac{1}{2}(k_A-a)$ and $n \sin \frac{1}{2}(k_B-b)$.

The servomotor 177, operating through reduction gearing 205, drives a shaft 206 and also actuates one input of a mechanical differential 208. When the servomotor is at equilibrium the shaft 206 is rotated in proportion to the angle $\phi_a$. Shaft 206 turns a contact arm 217 on the voltage divider 164, and also is geared to the shaft 55. Voltage divider 164 has a resistance which varies according to the cosine of the angle of rotation and is arranged with inputs angularly spaced 180° and supplied from the push-pull amplifier 171 in phase opposition. The contact 217 therefore taps off a voltage which is conducted through a lead 218 and that corresponds to the signal impressed by amplifier 171 multiplied by the function $\cos \phi_a$.

The shaft 51, manually rotated in proportion to the angle $\phi$, is mechanically connected to a shaft 212 supplying the second input for differential 208 whose output shaft 209 is rotated in accordance with the algebraic difference of the input rotations. Shaft 209 turns a contact arm 211 on the voltage divider 165 which, like voltage divider 164, has a resistance wound according to a cosine function. The push-pull amplifier 172 impresses out-of-phase voltages across the balanced inputs of the voltage divider 165. A lead 219 attached to the contact arm 211 conducts a potential away from voltage divider 165 that is equal to the impressed voltage multiplied by the factor $\cos (\phi - \phi_a)$.

In the operation of the structure of Fig. 11, double throw switches 221 to 225 are provided to facilitate interconnection between the circuits which introduce the various functions. When these switches are thrown to the right, as illustrated, computer 47 is adapted to constitute Equation 13, and when the switches are thrown to the left Equation 14 is formulated.

The operation is discussed with connections as illustrated, and the operation in the other switching position will then be evident particularly in view of the structural symmetry of the system. A source 226 of alternating voltage having a positive reference phase is connected through the switch 221 to the lead 215 which impresses the potential upon voltage divider 157. The buffer amplifier 166 transfers the potential on the contact arm 197 to the input of the voltage divider 159. The amplifier 168 responds to the potential on contact arm 202 and supplies this voltage over a lead 227 to the switch 225. This potential has undergone two multiplications and is proportional to the factor $n \sin \frac{1}{2}(k_A+a) n \sin \frac{1}{2}(k_A-a)$ which is employed by computer 57 in the calculation of the distance $r$. Lead 227 is therefore connected through switch 225 to the lead 58 running to computer 57.

Lead 227 is also connected through both switches 225 and 224 to lead 214 which supplies the input voltage for voltage divider 156. The output of voltage divider 156 is impressed through amplifier 172 upon voltage divider 165. The potential from the contact 211 of voltage divider 165 is conveyed by the lead 219 through switch 223 to a lead 228 which supplies one of the inputs for the sum amplifier 176. The voltage thus produced is proportional to the signal on lead 227 multiplied by the action of voltage dividers 156 and 165 and is, therefore, proportional to the factor $$+n \sin \tfrac{1}{2}(k_A+a)n \sin \tfrac{1}{2}(k_A-a)n \sin b \cos(\phi-\phi_a)$$

Lead 214 is also connected to the amplifier 174 which provides a potential for voltage divider 163. The output of this voltage divider is fed through switch 222 to a lead 229 comprising a second input for the sum amplifier 176. The potential impressed through lead 229 is, it seems evident, proportional to the factor $$+n \sin \tfrac{1}{2}(k_A+a)n \sin \tfrac{1}{2}(k_A-a)n \sin k_B$$

A potential source 231 having a negative phase is connected through the switch 224 to the lead 213, which supplies this potential to the voltage divider 155. The signal on the contact arm 185 is impressed through the buffer amplifier 171 upon the voltage divider 164. The output lead 218 from the contact arm 217 of voltage divider 164 is connected through switch 223 to a lead 232 which comprises a portion of an input circuit of a sum amplifier 175.

The lead 213 also introduces the voltage from source 231 through the buffer amplifier 173 to the voltage divider 162. The contact arm 189 of voltage divider 162 is connected through the switch 222 to a lead 233 comprising a second portion of the input circuit of the sum amplifier 175.

It will be observed that the voltage on lead 232 is proportional to $-n \sin a \cos \phi_a$, and the voltage on lead 233 is proportional to $-n \sin k_A$. The sum amplifier 175 acts to add these factors together and supplies their sum through the switch 221 to the lead 216. A lead 234, an extension of lead 216, is connected through the switch 225 to the lead 59 and thus provides computer 57 with the factor $$-\{n \sin k_A + n \sin a \cos \phi_a\}$$

The lead 216 also supplies this signal to voltage divider 158 whose contact arm 199 is connected to the amplifier 167. The voltage divider 161 is energized by the output of amplifier 167, and its contact arm 204 provides a potential which is transferred by amplifier 169 to a lead 235. The lead 235 is connected through switches 225 and 224 to a lead 236, which supplies a third input circuit in the sum amplifier 176. The voltage on lead 236 is proportional to the factor $$-\{n \sin k_A + n \sin a \cos \phi_a\}\{n \sin \tfrac{1}{2}(k_B+b)n \sin \tfrac{1}{2}(k_B-b)\}$$

The sum amplifier 176 is adapted to add vectorially its three input signals and to supply their resultant to a phase sensitive amplifier 237 which actuates motor 177 in a direction and at a speed proportional to the signal derived by amplifier 176. Since the three factors applied in the form of voltages to amplifier 176 comprise the left-hand portion of Equation 13, the output of this amplifier is reduced to zero only when this equation is satisfied.

Motor 177 alters the attenuations introduced by voltage dividers 164 and 165 until the assumed value for $\phi_a$ is made correct, at which moment the voltage controlling the motor 177 drops to zero. The sensitivity of the servo device must be great to provide high accuracy in the angle $\phi_a$, and the amplification factor of amplifier 237 is preferably very high in order to provide the motor 177 with a control voltage when the solution is very nearly attained and the output of sum amplifier 176 is correspondingly small. It is to be observed that all computation of $\phi_a$ is made on a null basis; consequently the accuracy of the calculation is insensitive to changes in source voltage.

Discussion of Figs. 5-8

It has been shown that computer 47 operates to solve either Equation 13 or 14 which equations have the more general form:

$$U \cos(\phi-\phi_a) + V \cos \phi_a + W = 0 \qquad (8)$$

where U, V, and W are determined by $k_A$, $k_B$, $a$, and $b$ which are constants for a particular point in space and for a given group of radio stations. An understanding of the characteristics of this equation is an extremely helpful aid to the intelligent supervision of the calculating and control system. Mathematically this equation always has two solutions which may define any one of three physical conditions. The two values of $\phi_a$ that satisfy Equation 8 may correspond to one physical position of the craft and a physically impossible position, to a common physical position, or to two physically distinct positions. These three possible conditions are illustrated by Figs. 6, 7, and 8, which comprise modified polar plots of the sum of the factors on the left side of Equation 8 as a function of the assumed angle $\phi_a$. The graphs 6, 7, and 8 are drawn to the same scale, and they define craft positions P, P', and P'', respectively, shown in Fig. 5 relative to the stations O, A, and B. The sum of the factors on the left side of Equation 8 is of course proportional to the error signal applied to the servo device 177 and may be symbolized by the term $\epsilon$.

In Figs. 6, 7, and 8, a dashed circle 241 of arbitrary size defines points of zero error signal. Assumed values of $\phi_a$ are measured angularly around centers 242 of circles 241 in a clockwise direction. The error corresponding to a particular assumed angle is measured along a radius vector from its point of intersection with the zero error circle 241. Positive errors are placed outside this circle and negative within. Mathematical solutions of Equation 8 occur at values of $\phi_a$ where the error signal curves intersect with the zero error circles 241, as indicated by reference numerals 243 to 247. This method of plotting the operational characteristics of computer 47 combines the continuity of angles inherent in polar coordinates with the graphical representation of polarity so convenient in rectangular coordinates.

In Fig. 6 the intersection 243 corresponds to a solution for the angle $\phi_a$ at the position P in Fig. 5. Another solution at point 244 corresponds to a position which is at a negative distance from the point O and therefore physically impossible.

It is observed that the error signal $\epsilon$ in the neighborhood of the solution 243 increases with increasing angle, whereas the error signal in the neighborhood of the solution 244 decreases with increase in the assumed angle $\phi_a$. The servo system, dependent upon the phasing of the phase sensitive amplifier 237 or of the gearing driven by the motor 177, finds a point of stable equilibrium at one solution and a point of unstable equilibrium at the other solution. In other words, the error signal curve has a positive slope passing through one null position and a negative slope passing through the other null position. Reversal of the servo system phasing relationships will therefore cause the system to drive away from one solution and seek the other solution. Stable operation of any servo system requires that the control signal reverse upon passing through zero. Solution 245, indicated in Fig. 7 and corresponding to the point P' in Fig. 5, is not suitable for servo operation since the error signal always remains of the same phase or polarity. This condition occurs whenever the two solutions are at the same angle. It is therefore important to find the locus of equal roots of the Equation 8 for this locus defines the phasing boundaries of the computer system.

It may be demonstrated that these phasing boundaries are defined in part by lines 247, 248, 249 and 251, which are shown in Fig. 5 to be degenerate hyperbolas constituting straight lines starting from the foci O, A, and B and extending outwardly along the axes of symmetry of the two hyperbolic systems toward infinity. The phasing boundaries are further defined by points of tangency between the two families of hyperbolas. These points of tangency constitute straight lines 252 and 253 starting from the singular foci A and B, respectively, that is those foci not common to both hyperbolic systems. Boundaries 252 and 253 extend to infinity along lines parallel to the asymptote common to both families of hyperbolas. These boundaries are therefore extensions of a line drawn between A and B. It is now observed that the position P' lies on one of these boundaries as might be expected.

The phasing boundaries 247 through 253, in general, divide the space surrounding the radio stations into four infinite areas 254, 255, 256, and 257. It may be shown that solutions within the area 254 require a particular phasing of the servo system, while solutions for points within areas 255, 256 and 257 require an opposite phasing of the system. For example, in Fig. 8 solution 246 corresponds to the angle $\phi_a$ at point P'' and has the same phasing as the solution 243 in Fig. 6 while the solution 247 requires an opposite phasing and corresponds to the value of $\phi_a$ at a point P''' within the area 255. On either side of the phasing boundaries the computer 47 solves for a definite position and the roughest idea of a craft's location is all that is necessary to insure that the servo system follows the correct solution. In the case of a solution like that at 244 in Fig. 6, the operation of computer 57 immediately indicates the incorrect phasing of computer 47 by attempting to drive to a negative value of the distance $r$.

*Discussion of Fig. 12*

Referring now to Fig. 12, an $r$ computer indicated by the broken line 258 solves either the Equation 11 or 12 depending upon the factors supplied in the form of voltages over leads 58 and 59 from computer 47. The lead 58, according to the illustrated operation of Fig. 11, supplies the factor $-\{n \sin k_A + n \sin a \cos \phi_a\}$ to a voltage divider 259. The voltage divider has a resistance which varies according to the product of $n/2$ and the tangent of its mathematical angle of rotation. Voltage divider 259 has a contact arm 261 to which is connected a lead 262 running to a difference amplifier 263. The lead 58 is also connected to difference amplifier 263 and supplies the factor $n \sin \frac{1}{2}(k_A + a) n \sin \frac{1}{2}(k_A - a)$ calculated by computer 47. Amplifier 263 is adapted to take the algebraic difference of the applied signals and impress the resultant potential on a phase sensitive amplifier 264 which in turn operates a motor 265. Motor 265 drives the shaft 62 through reduction gearing 266. The contact arm 261 is attached to this shaft, and therefore when the differences between the potentials on leads 262 and 58 are made zero by the action of motor 265, the shaft 62 is rotated in proportion to the distance $r$ and Equation 11 is satisfied. The value of $r$ appears as has been previously mentioned on a calibrated dial 61.

The shaft 62 rotates an arm 267 making contact with a voltage divider 268. The voltage divider 268 has a positively phased source of potential 269 impressed across it and has a resistance such that the voltage supplied to a lead 271 connected to conducting arm 267 is proportional to the factor $n \sin r$. The potential on lead 271 is impressed by a push-pull amplifier 272 across 180° angularly spaced inputs of a sinusoidal function voltage divider 273. The voltage divider 273 has two rotatable contacts 274 and 275 angularly displaced 90° and these contacts are rotated by an output shaft 280 of a differential 276 that algebraically adds rotations proportional to $\phi_a$ supplied by shaft 55 from computer 47 and $\theta$ introduced by manually adjusted shaft 64. The voltages on arms 274 and 275 are therefore proportional to the factors $n \sin r \sin (\theta + \phi_a)$ and $n \sin r \cos(\theta + \phi_a)$, respectively. A lead 270 connects arm 275 to a sum amplifier 277.

A voltage divider 278, across which is impressed potential from a source 279 in balanced phase relationship, has a resistance that introduces a multiplication factor proportional to the product of $n$ and the sine of the mathematical angle of rotation. The potential from the contact arm 281 of the voltage divider 278 is conducted over a lead 282 to the sum amplifier 277. The output of the sum amplifier energizes a phase sensitive amplifier 283 which actuates a servomotor 284. The motor 284 drives the contact arm 281 of the voltage divider 278 through reduction gearing 285 and also supplies an input for a mechanical differential 286. When the output of the sum amplifier 277 is zero Equation 19 is satisfied, and the contact arm 281 lies at an angle proportional to the algebraic difference between the latitude of the craft's position and the latitude of station O. Shaft 63 is manually set to the latitude of the station O and introduces this value to the differential 286 whose output shaft 67 is rotated in accordance with the algebraic sum of the input rotations. It is evident that this rotation is proportional to the latitude $L_P$ of the craft, which may be conveniently indicated by the calibrated dial 68 geared to shaft 67.

The shaft 67 also rotates a contact arm 287 of a voltage divider 288, across which is impressed the potential from a source 289 having negative phase. The voltage divider 288 has a resistance which varies in accordance with the cosine of the mathematical angle of rotation. The contact arm 287 applies the signal appearing thereat to a buffer amplifier 291 having a push-pull output circuit. The output of amplifier 291 is applied in phase opposition to a voltage divider 292 center-tapped to ground. The voltage divider 292 is adapted to multiply the potential impressed on it according to the product of $n$ and the sine of the mathematical angle of rotation of its sliding contact 293. A lead 294 connects contact 293 to one of the inputs of a sum amplifier 295. A lead 296 from the contact arm 274 on voltage divider 273 supplies a signal to amplifier 295 which has been shown to be proportional to $n \sin r \sin (\theta + \phi_a)$. The output of the sum amplifier 295 is provided to a phase-sensitive amplifier 297 which in turn controls motor 298. Motor 298 drives a shaft 301 through reduction gearing 299. The contact arm 293 is mounted on shaft 301 and is rotated thereby until the signal on lead 294 cancels the signal from lead 296, under which conditions the Equation 22 is satisfied, and the rotation of shaft 301 is thus proportional to the algebraic difference between the longitudes $\lambda_P$ and $\lambda_O$ of the craft and the radio station O, respectively. The rotation proportional to $\lambda_P - \lambda_O$ is algebraically added in a mechanical differential 302 with a rotation proportional to $\lambda_O$ supplied by the manual setting of the shaft 69. The shaft 72 is actuated by the output of differential 302 and is therefore rotated in proportion to the longitude $\lambda_P$ of the craft, which value is indicated on the calibrated dial 73.

*Discussion of Fig. 13*

Referring now to Fig. 13, the shaft 72, rotated in accordance with the value of the craft's longitude $\lambda_P$ calculated by computer 57, is connected to an input of mechanical differential 303. The shaft 76, manually adjusted according to the longitude $\lambda_T$ of the desired objective T, is connected to the second input of differential 303. An output shaft 304 of the differential 303 is turned according to the algebraic difference between the input rotations and actuates the contact arm 305 of linear voltage divider 306. A source 307 of positive and negative phase potential is impressed across voltage divider 306 which is center-tapped to ground. Since the resistance variation of voltage divider 306 is linear, the potential appearing at contact 305 is proportional to the factor $q(\lambda_P - \lambda_T)$ which is applied over lead 310 to a buffer amplifier 318.

A shaft 67', driven by shaft 67 in accordance with the latitude $L_P$ of the craft as calculated by computer 57 and the shaft 75, manually adjusted according to the latitude $L_T$ of the objective, provide inputs for mechanical differentials 308 and 309. An output shaft 311 from differential 308 is actuated according to the algebraic difference between the input rotations, while an output shaft 312 from differential 309 is turned in accordance with one-half the algebraic sum of the applied rotations. Shaft 312 actuates a conducting arm 316 which makes sliding contact with a voltage divider 313. Voltage divider 313 has a resistance winding which varies according to the cosine of the mathematical angle of rotation.

The amplifier 318 transfers the signal appearing on contact 305 of voltage divider 306 to the voltage divider 313. In consequence, the signal fed to a lead 319, attached to the contact arm 316, and appearing at the balanced outputs of a buffer amplifier 321, is proportional to the factor $$q(\lambda_P - \lambda_T) \cos\left(\frac{L_P + L_T}{2}\right)$$

which is equal to the length $x_P - x_T$ of line 33 shown in Fig. 4.

The shaft 311 turns the arm 315 making contact with a linear resistance voltage divider 314. A source 317 of positive and negative phase potential is impressed across voltage divider 314 which is center-tapped to ground. The voltage present at arm 315 and fed by a lead 322 to a push-pull amplifier 323, appears at the output of the latter with a magnitude proportional to $q(L_P - L_T)$ equal to the length $y_P - y_T$ of the line 34 shown in Fig. 4.

The outputs of amplifiers 321 and 323 are impressed across voltage dividers 324 and 325, respectively, having rotatable contact arms 326 and 327, respectively, fastened to the shaft 77. Voltage dividers 324 and 325 are adapted to multiply the potentials impressed thereon by the cosine and the sine, respectively, of the angular position of shaft 77. Shaft 77 is set in accordance with the course angle $\tau$ of the desired ground track or path of travel. Leads 328 and 329 connected to contact arms 326 and 327, respectively, supply their respective potentials to a sum amplifier 331, which acts to add the applied potentials and supply their vector sum to the lead 85. The signal on lead 85 corresponds to the perpendicular displacement $d$ of the craft from the ground track S, as expressed by Equation 26.

A phase detector 332 is connected to lead 85 and is adapted to provide a reversing polarity variable magnitude direct voltage to the right-left indicator 82 which indicates which side of the ground track the craft lies on and the substantially perpendicular distance therefrom. It is to be observed that meter 82 may be directly calibrated in terms of distance, since the potential which energizes it is independent of the positions of the radio stations or of the distance of the craft measured along the ground track.

The distance $s$ may be expressed, as has been shown in Equation 27 or 28, to be equal to the length of lines 33 or 34, respectively, illustrated in Fig. 4, multiplied by the cosecant or secant of $\tau$, respectively. The output signal of amplifier 321 is proportional to the length of line 33 and the output signal of amplifier 323 is proportional to the length of line 34. It is not possible, however, to multiply these factors by the cosecant and secant functions directly since it is recalled that these quantities involve infinite discontinuities. To maintain these functions within the bounds of positive or negative unity, Equations 27 and 28 are multiplied by a fraction, say $\frac{2}{3}$, and employed alternately. Equation 28 is utilized for values of $\tau$ between about $-45°$ and $+45°$ and with a negative sign from about $+135°$ to $+225°$, while Equation 27 is employed for values of between $+45°$ to $+135°$ and with a negative sign from about $+225°$ to $+315°$. The means for accomplishing this result are now disclosed.

Shaft 77 also rotates brushes 333 and 334 which are angularly spaced 45° and adapted to make contact with at least one of four commutator segments 335—338. The segments are equally spaced 30° each covering 60° of arc. The brushes are arranged so that the zero angular position of brush 333 slightly overlaps segment 335. Phase reversing outputs of amplifiers 323 and 321 are connected to segments 335 and 336, respectively, while non-reversing outputs of these same amplifiers are attached to segments 337 and 338, respectively.

Leads 339 and 341 make connection between brushes 334 and 333, respectively, and opposite ends of a voltage divider 342, which is center-tapped to ground through a fixed resistor 343. The voltage divider 342 is wound according to a function which corresponds to the product of a constant fraction and the secant of $\frac{1}{2}$ the angular rotation of its contact arms 344 and 345. The fraction is so chosen that at the maximum positive or negative angles utilized the multiplication factor of the voltage divider 342 is equal to negative or positive unity, respectively. For example, the voltage divider 342 is here illustrated as having a resistance which varies according to $\frac{2}{3}$ the secant function from about $-48°$ where the function is equal to $+1$ to about $+48°$ where the function is equal to $-1$. Under these conditions the value of fixed resistor 343 is such that the impressed voltage drops $\frac{1}{3}$ of its value in the voltage divider 342 and the remaining ⅔ in the fixed resistor.

The two contact arms 344 and 345 are physically spaced 180° and rotated at twice the angle of shaft 77 through step up gearing 346 and shafts 347 and 348. Angles are measured from the connection of resistor 343 to the arm 344.

A snap action switch 349 is adapted to connect the output lead 94 with either contact arm 344 or 345 through contact points 352 or 351, respectively. Switch 349 is actuated by the shaft 348 so that it transfers its connection every 180° of rotation, that is, every 90° of mathematical rotation. The switch 349 has no intermediate equilibrium position, and its positive operation may be insured by employing magnetized contacts at 351 and 352. It is observed that there is a space allowance made on voltage divider 342 at the beginning and end of its resistance winding owing to the fact that the ends are less than 180° apart, so that either contact arm 344 or 345 may supply the signal to output lead 94 according to whether the switch 349 connects with contact points 352 or 351, respectively.

It is further noted that brushes 333 and 334 both supply the correct voltages to voltage divider 342 over these transitional angles. Therefore, irrespective of the angle τ, lead 94 is supplied with a voltage proportional to the distance $s$ of the craft from the objective. A phase detector 353 provides a direct voltage of positive or negative polarity to the meter 83 dependent upon whether the objective lies ahead or behind the craft, and the meter 83 may be conveniently calibrated in terms of distance.

Discussion of Fig. 14

Referring now to Fig. 14, the embodiment of the course control 84 chosen for illustration is one particularly adapted for aircraft. However, it is to be understood that the navigational system of the present invention is equally useful for sea borne craft. The control 84 has as its dominant feature a gyroscopically stabilized automatic pilot device similar to that disclosed in U. S. application 452,662, filed July 28, 1942, in the names of Carl A. Frische, et al. Patent No. 2,415,430, granted February 11, 1947. Although any well known automatic pilot may be utilized, it is convenient to employ an electromechanical pilot in conjunction with the electromechanical computer 74.

A magnetically slaved directional gyroscope 361 provides an azimuth reference in accordance with which the heading of the craft is controlled. An electrical control signal is produced by the interaction of a rotor 362 and a polyphase winding 363 of a pick-off device 364 comprising an alternating current electrical transmitter of the "Selsyn" type. The winding 362 of the transmitter 364 is rotated by a shaft attached to the vertical ring of gyroscope 361 and is energized by a source 365 of alternating potential. The polyphase winding 363 is fixed relative to the craft and has voltages induced in its branches by winding 362 that correspond to the angular relationship of these two windings. An electrical differential 366 of the same general type as device 364 is employed to enable the heading about which the craft is stabilized to be chosen at will. The polyphase winding 367 of device 366 is mounted on a shaft 369, and its branches are connected to corresponding portions of winding 363. Shaft 369 is driven by the output of a mechanical differential 371 one of whose input shafts is the course setting shaft 86. Shaft 86 is adjusted to the desired heading as indicated by the calibrated dial 87. The single phase winding 368 of device 366 produces an output signal whenever its angular position relative to winding 367 differs from the angular relationship of windings 362 and 363. The resulting signal is fed through a sum amplifier 372 to a phase sensitive amplifier 374. The amplifier 374 energizes the windings 375 and 376 of a torque motor 377 in push-pull phase relationship. A rotatable magnetic armature 378 of torque motor 377 actuates pilot valves 379 of a hydraulic type servomotor 381. The servomotor 381 exerts a force on the rudder 91 that is proportional to the control signal.

As long as the craft maintains the proper heading no control signal is induced in the winding 368 and the rudder 91 remains centralized. Any change in the heading of the craft causes winding 363 of transmitter 364, fixed to the craft, to rotate relative to winding 362, fixed to the shaft on the gyro 361 which maintains its orientation in space. Under these conditions the identity of angular relationships between the windings of devices 366 and 364 is destroyed, and a signal appears across winding 368 which causes the proper force to be applied to rudder 91 to return the craft to its predetermined heading. The craft is turned by the action of rudder 91 until winding 363 regains its proper position relative to winding 362. The amplifier 374 includes antihunting means in the form of rate circuits adapted to produce velocity and acceleration components from the turn signal output of winding 368, which, when applied to the servomotor 381, prevent yawing or hunting of the craft about the desired heading.

An attitude gyroscope 382 is employed to provide stabilization of the craft against roll and pitch. The pitch axis is not illustrated because the present invention does not affect the operation of the craft about this axis. A roll pick-off 283 is shown as of the "Telegon" type having a magnetic Z-shaped armature 384 which is held level by the gyroscope 382 within a stationary winding 385 energized by an alternating voltage. A field winding 386 comprising two perpendicular coils connected in phase opposition has a resultant voltage induced in it by winding 385 according to the relative orientation of the armature 384. The output signal of winding 386 is fed through a sum amplifier 387 to a phase sensitive amplifier 388. The amplifier 388 actuates ailerons 92 through torque and servomotors similar to those that operate rudder 91. For level flight there is no signal from the roll pick-off 383.

If the craft rolls, a signal is produced by the relative angular displacement between armature 384 which is fixed to the roll axis of the attitude gyroscope 382 and hence maintains its angle in space, and the winding 386 which is fixed to the craft. This signal energizes the amplifier 388 which in turn serves to adjust the ailerons 92 so as to return the craft to a level attitude.

The lead 85 from the computer 74 is connected through a switch 80 to amplifiers 389 and 392, and also to a phase sensitive amplifier 391. Any signal caused by a displacement of the craft from the desired ground track is impressed upon amplifier 389 where it is amplified, passed through a limiter 393, and applied to the sum amplifier 372. The displacement signal appearing at the input of amplifier 372 is algebraically added to any signal from winding 368. The resultant signal from amplifier 372 causes the craft to turn through an angle such that the output signal from winding 368 is made equal and opposite to the displacement signal. Thus the craft is stabilized about a new heading that differs from the heading initially predetermined by shaft 86 by an angle proportional to the magnitude and in a direction determined by the phase of the displacement signal.

The displacement signal also actuates a motor 394 by means of the phase sensitive amplifier 391, in a direction according to the phase of the control signal and at a speed substantially proportional to the magnitude of the same. The motor 394 drives a shaft 398 through reduction gearing 395 and a friction clutch 396. Shaft 398 supplies the second input for the mechanical differential 371. The gearing 395 provides such a great speed reduction that the shaft 398 is turned only very slowly. The angular position of this shaft, therefore, tends to settle upon the average value of the displacement signal. If no cross wind is present and the shaft 86 has been set to cause the craft to be stabilized about a heading identical to angle $\tau$ of the desired ground track, the craft will be maintained on the ground track by the action of amplifier 389 alone and the time integral or residual value of the displacement signal will be zero. The presence of cross wind, however, prevents the craft from remaining on the ground track without the aid of the error integrating motor 394. The craft under these conditions lies down-wind of the ground track at a distance such that the displacement signal causes the craft to turn towards the desired track at an angle substantially equal to the drift angle.

Motor 394 responds to this residual displacement signal and slowly rotates shaft 398 until the required crab angle is added in the differential 371 to the course angle set by shaft 86. The stabilized heading of the craft, predetermined by the shaft 369, is therefore altered until the craft eventually lies on the ground track, heading to windward of this track sufficiently to provide a lateral component of velocity relative to the ground track that is equal and opposite to the cross-wind velocity. The shaft 88 is driven by the shaft 398 so that accompanying dial 89 indicates the average drift angle. Limit stops 397 are provided on shaft 88 in order that the rotation of shaft 398 does not introduce a drift angle substantially larger than those usually encountered.

If the operation of the course control 84 is initiated while the craft is very far from the ground track, it is possible that the integrating motor 394 will attempt to introduce an excessive drift angle. This possibility is prevented because when the limit stop 397 is reached, friction clutch 396 slips and no additional rotation of shaft 398 may be effected. When the drift angle is approximately known, the task of motor 394 may be eased by presetting the shaft 88.

Means are provided for banking the craft in accordance with the time rate of change of the displacement signal. This is accomplished by amplifying the signal in amplifier 392 and obtaining a direct voltage of a polarity and magnitude dependent upon the phase and magnitude, respectively, of the displacement signal by means of a phase detector 399. This direct voltage has an amplitude that varies at the same rate as the effective amplitude of the initial signal. This rate is measured by passing the rectified signal through a differentiator and limiter 401, the output voltage from which is proportional to the time rate of change of the original displacement. Device 401 supplies the signal input for a balanced modulator 402 which converts the impressed signal to an alternating voltage that is applied to the sum amplifier 387. This latter voltage causes the aircraft to bank through an angle such that the output of field winding 386 in pick-up 383 is made equal and opposite to the banking signal obtained from the measurement of the time rate of change of the displacement signal.

It has been found, as discussed in detail in the above-mentioned application 452,662, that after a turn has been initiated by the rudder 91, the turn is maintained substantially entirely by the ailerons. An aerodynamic side-pressure will be exerted on the rudder whenever the plane is improperly banked which results in the rudder assuming a different position from that which it should assume when the craft is properly banked. To insure that the bank, as provided by the differentiation of the displacement signal is correct a bank correction circuit 403 is provided which applies the average signal appearing across the output of phase sensitive amplifier 374 after a suitable time delay to the sum amplifier 387. The delay within the bank correction circuit 403 is desirable in order to permit the craft to enter its turn and bank before the correction is applied so that the correction applied will correspond to the actual turn condition rather than to the transient condition existing while the craft is entering the turn. The delay also serves to damp and prevent hunting in the system, wherein the rudder signal controls the aileron servo motor through the correction circuit to bank the craft and thereby decrease the rudder signal. Furthermore, this delay permits the attitude gyro 382 to stabilize the attitude of the craft with respect to quickly applied forces, such as gusts of wind that might tend to change the banking angle without being affected by the change in rudder signal thereby produced.

It is to be observed that unlike the prior art, the displacement signal provided over lead 85 is directly proportional to the substantially perpendicular distance of the craft from the ground track, and therefore the rigidity of control with which the craft is maintained on the ground track is entirely independent of the craft's position along this track. Another advantage is that any misadjustment in setting the shaft 86, or errors in the magnetic variation or deviation corrections applied to the magnetically slaved directional gyroscope 361 are overcome by an additional correction automatically introduced by the integrating motor 394. Under these conditions dial 89 will not indicate the exact drift angle but the craft will be correctly guided along the desired ground track.

It is not always necessary to obtain the displacement signal in the manner described, for example, when the objective T is identical with the reference station O considerable simplification in the system results. The computation of the craft's latitude and longitude and of the displacement $d$ and distance $s$ may be dispensed with, thus entirely eliminating computer 74 and a large portion of the computer 57. Under these conditions switch 80 is connected to contact 300 which, by reference to Fig. 12, is seen to be attached to lead 296. Shaft 64 is adjusted to the difference between the desired homing course as measured at O and the angle $\theta$. With this mode of operation shaft 280 is rotated in proportion to the angular difference between the actual great circle arc r on which the craft is located, and the great circle arc along which it is desired to travel. The potential appearing on lead 296 and applied to contact 300 may be shown to be substantially proportional to the distance between the two great circle arcs measured at the position of the craft.

*Discussion of Fig. 15*

Referring now to Fig. 15 there is illustrated an embodiment of the ground speed computer 93 that obtains an average value for the craft's ground speed, since the instantaneous time rate of change of the distance s in the present system as adapted for long ranges is usually too slow to permit the measurement of rates by the usual method of voltage differentiation. The operation of the various computers involved in the calculation of the distance of the craft from the desired objective may also introduce spurious rates. Thus, the present embodiment derives the necessary information through the indirect process of comparing the actual distance with an assumed distance that is generated in the following manner.

A constant speed motor 405 turns a friction disc 406, comprising a portion of a variable speed drive. A cylinder 408 is driven at a variable rate by the disc 406 through a radially-slidable ball carriage 407 which is radially positioned on the friction disc by means of a pinion 409 engaging a rack bar 411 attached to the ball carriage assembly.

The cylinder 408 provides one of the inputs of a mechanical differential 412. An output shaft 413 of the differential 412 drives a slidable contact arm 414 of a linear voltage divider 415 at a rate proportional to the position of ball carriage 407. The voltage divider 415 is center-tapped to ground and has a potential impressed across its balanced inputs in phase opposition by a source 416. A lead 417 connects the contact arm 414 to an input of a sum amplifier 418. The voltage conducted by lead 417 has a magnitude proportional to the assumed distance s' whose value is indicated by the dial 95 geared to the shaft 413.

The actual value of the distance s from the craft to the objective is applied from computer 74 over lead 94 and through switch 90 to a second input of the amplifier 418. Amplifier 418 serves to compare the relative amplitudes of the true and assumed distances. Any difference between their values results in a voltage which is applied to a phase detector 430. The reversible polarity direct voltage from detector 430 energizes a zero-center meter 97 that indicates whether the assumed distance leads or lags the actual distance. An adjustment shaft 96 mechanically connected to the second input of differential 412 permits the contact arm 414 to be rotated independently of the motion transmitted to it from motor 405 so that arm 414 may be initially adjusted to tap off a voltage equal and opposite to that supplied over lead 94. The correctness of this adjustment is attested by the centralized indication of meter 97.

If the rate of rotation of shaft 413 does not produce a voltage s' that varies in a similar manner as the computed voltage s, a signal caused by the gradually increasing inequality between the potentials is supplied by the sum amplifier 418 to a phase sensitive amplifier 419 which energizes a servo motor 420. Motor 420 drives a worm 422 through reduction gearing 421. Worm 422 is directly connected to shafts 425 and 426 but actuates the shaft 96 through a friction clutch 423. Clutch 423 enables the shaft 96 to be manually rotated independent of the operation of the motor 420 while the worm prevents interaction with shafts 425 and 426. Shafts 425 and 426 have cupped portions of magnetic clutches 427 and 428, respectively, attached thereto. The other halves of the clutches 427 and 428 are longitudinally-slidably fastened to shafts 98 and 101, respectively.

A shaft 429 interconnects shaft 98 and pinion 409. Magnetic clutches 427 and 428 are adapted to be alternatively energized by a source of potential through a switch 431. In the drawing the clutch 427 is shown energized, and thus provides a connection between shaft 425 and 98. In the illustrated mode of operation the servomotor 420 actuates shaft 413 to reset contact 414 to such a position as to eliminate the servo control voltage. Simultaneously the pinion 409 is turned to readjust the ball carriage 407 altering the rate of rotation of shaft 413 in a sense such that the newly assumed rate more nearly corresponds to the actual rate. By selecting a suitable proportionality factor between the relative amounts that shafts 96 and 98 are rotated, the shaft 413 may be caused to maintain a position and a time rate of change of position that follows the distance and time rate of change of distance exactly.

Under equilibrium conditions dial 99, therefore, indicates the average ground speed of the craft. In the alternate mode of operation, switch 431 energizes magnetic clutch 428 and shaft 101 attached to the speed control of device 102 is actuated by the servomotor 420. The rate of rotation of shaft 413, under these conditions, is predetermined by the adjustment of shaft 98, and consequently the craft's speed is adjusted so that now the calculated rate is made to correspond with the assumed rate.

An electrical contact 432, mechanically attached to a rack bar 433, is positioned by a pinion 434 in accordance with the assumed value of the distance. The shaft 103, to which is geared the dial 104, mounts a pinion 436, which engages a rack bar 435 on which is mounted an electrical contact 437 energized by a source of voltage. Contact 437 may therefore be positioned according to the setting of dial 104 with the result that when the craft reaches the distance from the objective corresponding to this setting, electrical connection is made with contact 432 and a lead 105, electrically attached thereto, conducts a signal denoting this condition to the controlled device 106.

This simple device has many uses. For example, if the craft must cross any of the phasing boundaries, as discussed with reference to Fig. 5, the shaft 103 may be adjusted so that the device 106 warns the navigator of the proximity of such boundary, or turns off all or part of the computing and control system until this boundary has been crossed, and the navigator has reversed the phasing of computer 47.

When the objective is the reference station O considerable simplification in the computing apparatus may be made as mentioned with reference to Fig. 14. Under these conditions switch 90 may be connected to contact 270 which is attached to lead 271, shown in Fig. 12. The potential on lead 271 is substantially proportional to the distance between the craft and the point O as has been previously disclosed. Thus, the computation of $L_P$, $\lambda_P$, $d$, and $s$ may be dispensed with when the craft is homing on the reference station O.

The military applications of the present invention are now undoubtedly evident to one skilled in the art. The system provides all the information that must ordinarily be obtained by a bombsight. A target may be chosen as the objective T such as a factory having a permanent position indicated on a map, or a supply dump having a temporary position predetermined by the aid of reconnaissance photographs. The ground track is initially made to pass through the target by setting the dials 78 and 79. When the ground speed and drift angle have been automatically indicated by dials 99 and 98, respectively, the ground track may be shifted sidewise to take into account the cross trail distance, by inserting the necessary corrections to $L_T$ and $\lambda_T$ on the shafts 75 and 76, respectively. The net range may then be set on dial 104 and irrespective of visibility conditions when the craft reaches the release point the bomb load will be dropped automatically in the manner similar to the prior art technique.

The present invention discloses an integrated system of navigation that is adapted for automatic position-finding in any desired coordinate system, for ground track indication, or for complete control over the space-time relationship between a craft and the surface of the earth.

In order to avoid unnecessarily burdening the specification many possible changes and variations in the above construction, and many apparently widely different embodiments of the invention have not been discussed in detail. An electromechanical embodiment was chosen for illustrative purposes because it afforded great clarity in the drawings and descriptive simplicity, but it is obvious to one skilled in the art that mechanical motion may be employed as the sole medium in which calculation of the present invention may be carried out. A more purely mechanical computer has a structure radically different from the embodiment employed to disclose the invention, but the essence of the device is the same. It is therefore intended that all matter contained in the above description or shown in the accompanying drawings shall be considered as illustrative and only limited in scope by the appended claims.

Having described my invention, what I claim and desire to secure by Letters Patent is:

1. In a navigation system for a dirigible craft, means for producing a determination of the differences in the distances between said craft and a plurality of mutually separated reference stations thereby defining the craft position in hyperbolic coordinates, means for setting up indications corresponding to the position of a known point and an electro-mechanical coordinate computer controlled by said first named means and said means for setting up indications for converting said position from hyperbolic coordinates into polar coordinates originating in one of said stations.

2. In a navigation system for a dirigible craft, means for producing a determination of the differences in the distances between said craft and a plurality of mutually separated reference stations thereby defining the craft position in hyperbolic coordinates, converting means for converting said position from hyperbolic coordinates into polar coordinates originating in one of said stations, and computing means for deriving and indicating said position in terms of at least one of the earth's geographical coordinate lines, said computing means being responsive to said converting means and to at least one given geographical coordinate of said one of said stations.

3. In a navigation system for a dirigible craft, means for producing a determination of the differences in the distances between said craft and a plurality of mutually separated reference stations and for defining the craft position in hyperbolic coordinates, converting means for converting said position from hyperbolic coordinates into polar coordinates originating in one of said stations, and computing means for deriving and indicating said position in terms of latitude and longitude, said computing means being responsive to said converting means and to the given latitude and longitude of said one of said stations.

4. In a navigation system for a dirigible craft, means for producing a determination of the differences in the distances between said craft and a plurality of mutually separated reference stations and for defining the craft position in hyperbolic coordinates, converting means for converting said position from hyperbolic coordinates into polar coordinates originating in one of said stations, and displacement deriving means responsive to the positional data from said converting means and to given data of a desired ground track for deriving therefrom a signal proportional to the displacement of said craft from said ground track.

5. In a navigation system for a dirigible craft, means for producing a determination of the differences in the distances between said craft and a plurality of mutually separated reference stations and for defining the craft position in hyperbolic coordinates, converting means for converting said position from hyperbolic coordinates into polar coordinates originating in one of said stations, computing means responsive to positional data from said converting means for deriving said position in terms of latitude and longitude, and displacement deriving means responsive to said latitude and longitude data and to given data defining a desired ground track for continually deriving therefrom a signal proportional to the displacement of said craft from said ground track.

6. In a navigation system for a dirigible craft, means for producing a determination of the differences in the distances between said craft and a plurality of mutually separated reference stations and for defining the craft position in hyperbolic coordinates, converting means for converting said position from hyperbolic coordinates into polar coordinates originating in one of said stations, computing means responsive to the given latitude and longitude of said one of said stations, and to said converting means for deriving said position in terms of latitude and longitude, and displacement deriving means responsive to said latitude and longitude data and to given data defining a desired ground track for continually deriving therefrom a signal proportional to the displacement of said craft from said ground track, and steering control means responsive to said signal for directing said craft toward said ground track.

7. In a navigation system for a dirigible craft, means for producing a determination of the differences in the distances between said craft and a plurality of mutually separated reference stations and for defining the craft position in hyperbolic coordinates, converting means for converting said position from hyperbolic coordinates into polar coordinates originating in one of said stations, and distance deriving means responsive to the positional data from said converting means and to given data of a desired destination for deriving therefrom a signal proportional to the distance of said craft from said destination.

8. In a navigation system for a dirigible craft, means for producing a determination of the difference in the distances between said craft and a plurality of mutually separated reference stations and for defining the craft position in hyperbolic coordinates, converting means for converting said position from hyperbolic coordinates into polar coordinates originating in one of said stations, and distance deriving means responsive to the positional data from said converting means and to given data of an objective lying on a desired ground track for deriving therefrom a signal proportional to the substantially perpendicular distance of said craft from said ground track, and for deriving therefrom a signal proportional to the distance of said craft from said objective, said distance deriving means including indicators for at least one of said signals.

9. A system for finding the position of a mobile craft comprising means for receiving signals on said craft from a plurality of separately spaced transmitters, said signals being transmitted in predetermined time relationship, means for determining the differences between the distances from the transmitters to said craft by measuring the time intervals between the arrivals at said craft of the signals from said separate transmitters, potentiometer input means for initially setting into said system quantities corresponding to the known positional data of said transmitters, means controlled by said measuring means for continuously supplying said system variable quantities corresponding to the differences between said distances, and a computer operating in response to said known and variable quantities for determining quantities characterizing the position of said craft, in polar coordinates.

10. A system for finding the position of a mobile craft comprising means for receiving signals on said craft from a plurality of separately spaced transmitters, said signals being transmitted in predetermined phase relationship, means for determining the differences between the distances from the transmitters to said craft by measuring the phase relationship at said craft of the signals received from said separate transmitters, potentiometer means for initially setting into said system quantities corresponding to the known positional data of said transmitters, means for continuously supplying said system variable quantities corresponding to the differences between said distances, and means operating in response to said known and variable quantities for determining quantities characterizing the position of said craft, in polar coordinates referring to one of said reference stations and means responsive to said polar coordinates to convert them to longitude and latitude.

11. A system for finding the direction of a mobile craft at an unknown position P from a first radio transmitter at a known position O, the distance $a$ from said first transmitter to a second transmitter at a known position A, the distance $b$ from said first transmitter to a third transmitter at a known position B, and the angle $\phi$ between A and B as measured at O being known, comprising means on said craft for receiving signals from said transmitters, said signals being transmitted in predetermined time relationship, means for determining the differences $$k_A \equiv r_A - r \text{ and } k_B \equiv r_B - r$$

where $r$ is the distance between O and P, $r_A$ is the distance between A and P, and $r_B$ is the difference between B and P, in accordance with the time intervals between the arrivals at said craft of said signals, the relation of said quantities being expressed by the equation:

$$(a^2 - k_A^2) b \cos(\phi - \phi_a) - (b^2 - k_B^2) a \cos \phi_a + (a^2 - k_A^2) k_B - (b^2 - k_B^2) k_A = 0$$

where $\phi_a$ is the unknown angle between A and P as measured at O, means for initially setting into said system quantities corresponding to the known positional data of said transmitters, potentiometer means for continuously supplying said system quantities corresponding to functions of said differences $k_A$ and $k_B$, and means responsive to inequality of said equation for introducing into said system a quantity corresponding to a value of $\phi_a$ which tends to be a continuous solution of said equation.

12. A system for finding the direction of a mobile craft at an unknown position P from a first radio transmitter at a known position O, the arc $a$ from said first transmitter to a second transmitter at a known position A, the arc $b$ from said first transmitter to a third transmitter at a known position B, and the angle $\phi$ between arcs $a$ and $b$ as measured at O being known, comprising means on said craft for receiving signals from said transmitters, said signals being transmitted in predetermined time relationship, means for determining the differences $$k_A \equiv r_A - r \text{ and } k_B \equiv r_B - r$$

where $r$ is the arc between O and P, $r_A$ is the arc between A and P, and $r_B$ is the arc between B and P, in accordance with the time intervals between the arrivals at said craft of said signals, the relation of said quantities being expressed by the equation:

$$(\cos k_A - \cos a) \sin b \cos(\phi - \phi_a) - (\cos k_B - \cos b) \sin a \cos \phi_a + (\cos k_A - \cos a) \sin k_B - (\cos k_B - \cos b) \sin k_A = 0$$

where $\phi_a$ is the unknown angle between arcs $a$ and $r$ as measured at O, potentiometer means for initially setting into said system quantities corresponding to the known positional data of said transmitters, means for continuously supplying said system quantities corresponding to functions of said differences $k_A$ and $k_B$, and means responsive to inequality of said equation for introducing into said system a quantity corresponding to a value of $\phi_a$ which tends to be a continuous solution of said equation.

13. A system for finding the longitude of a mobile craft comprising means for computing the latitude of said craft and the direction and distance of said craft from a predetermined position, potentiometer means for initially setting into said system a quantity corresponding to the known longitude of said predetermined position, potentiometer means for continuously supplying said system variable quantities corresponding to said latitude, direction, and distance of said craft, and means operative in response to said known and variable quantities for determining the longitude of said craft.

14. Apparatus for determining the longitude of a mobile craft when the longitude of a predetermined position, the latitude of said craft, and the direction and distance of said craft from said predetermined position are known, comprising the combination of means for obtaining a physically realizable quantity proportional to the product of a function of the latitude of said craft and a function of the algebraic difference between the longitude of said predetermined position and an assumed longitude of said craft, means for obtaining a similar physically realizable quantity proportional to the product of a function of said distance and a function of said direction, means for obtaining the algebraic difference between said quantities, and servo means actuated by said difference for correcting the assumed longitude of said craft.

15. Apparatus for determining the latitude of a mobile craft when the latitude of a predetermined position and the direction and distance of said craft from said predetermined position are known, comprising the combination of means for obtaining a physically realizable quantity proportional to the product of a function of said distance and a function of said direction, means for obtaining a similar physically realizable quantity proportional to a function of the algebraic difference between the latitude of said predetermined position and an assumed latitude of said craft, means for obtaining the algebraic difference between said quantities, and servo means actuated by said difference for correcting the assumed latitude of said craft.

16. Apparatus adapted for use on a navigable craft comprising computer means to set up data in physical form defining a desired ground track, computer means to set up data in physical form defining craft position, means for maintaining said craft on an adjustable heading, means controlled by said two computer means for obtaining a signal having a magnitude solely dependent upon the substantially perpendicular displacement of said craft from said desired ground track, and means for adjusting said heading in response to said signal to direct said craft to said ground track.

17. In a system for craft guidance, means adapted to maintain a craft on an adjustable heading, means for obtaining a signal having a magnitude solely dependent upon the substantially perpendicular displacement of said craft from a desired ground track, said means for obtaining a signal comprising potentiometer means for setting into said means data corresponding to the position of a known point and means for adjusting said heading through an angle substantially proportional to the magnitude of said signal to direct said craft to said ground track.

18. Apparatus adapted for use on a navigable craft comprising means for maintaining said craft on an adjustable heading, means for obtaining a signal having magnitude solely dependent upon the substantially perpendicular displacement of said craft from a desired ground track, means for changing said heading by an amount dependent upon the magnitude of said signal to direct said craft to said ground track, and means for adjusting said heading in response to the average magnitude of said signal to establish a drift angle of said craft with respect to said ground track.

19. In a navigation system for a dirigible craft, a computer comprising means to set up data in physical form defining a desired path of travel, means to set up data defining instantaneous craft position, and means for computing the distance of said craft from said desired path of travel; means controlled by said first named computer for maintaining said craft on an adjustable heading, and means for changing said heading in accordance with said computed distance to direct said craft toward said desired path of travel.

20. A ground speed control system comprising computing means for supplying said system with a quantity corresponding to the calculated distance of a mobile craft from a fixed point, means for supplying said system with a quantity corresponding to an assumed distance of said craft from said fixed point, said assumed distance being altered at a rate corresponding to a desired ground speed, servo means responsive to any difference between said calculated and assumed distances for causing said assumed distance to equal said calculated distance, and speed control means responsive to said servo means for maintaining the ground speed of said craft equal to said desired ground speed.

21. A ground speed indicating system comprising computing means for supplying said system with a quantity corresponding to the calculated distance of a mobile craft from a fixed point, a source for supplying said system with a quantity corresponding to an assumed distance of said craft from said fixed point, adjustable rate means for altering said assumed distance as a function of time, servo means responsive to any difference between said calculated and assumed distances for actuating said source to supply an assumed distance to equal said calculated distance and for simultaneously adjusting said rate means to prevent further differences between said calculated and assumed distances, the adjustment of said rate means serving to indicate the ground speed of said craft.

22. In a radio position finding system of the character described, means for continuously computing and supplying said system variable quantities corresponding to the space coordinates of a mobile craft, potentiometer means for initially setting into said system fixed quantities characterizing a desired ground track for said craft, and means operative in response to said variable and fixed quantities for determining a quantity corresponding to the substantially perpendicular displacement of said craft from said ground track.

23. In a navigation system for a dirigible craft, means for computing the latitude and longitude of said craft, means for initially setting into said system fixed quantities corresponding to the latitude and longitude of an objective and the direction of a desired ground track passing through said objective, potentiometer means for continuously supplying said system variable quantities corresponding to said latitude and longitude of said craft, and means operative in response to said variable and fixed quantities for determining the distance of said craft from said ground track.

24. In a radio navigation system for directing a mobile craft to a desired location, said system including at least three radio transmitters, one of which is placed between the others in known angular and spatial relationships, the combination comprising receiving means for receiving signals from said transmitters at said craft, comparison means responsive to said receiving means for deriving quantities representative of the differences of the distances to said transmitters, and a computer controlled by said first two means for transforming said quantities into a guidance signal for navigating said craft, along a desired course, said computer including potentiometer input means setting up quantities representing said desired course.

EDWARD C. STREETER, JR.

REFERENCES CITED

The following references are of record in the file of this patent:

UNITED STATES PATENTS

| Number | Name | Date |
|---|---|---|
| 1,340,573 | Steinmetz | May 18, 1920 |
| 1,893,009 | Ward | Jan. 3, 1933 |
| 2,066,949 | Ruiz | Jan. 5, 1937 |
| 2,137,847 | Libman | Nov. 22, 1938 |
| 2,148,267 | Honore | Feb. 21, 1939 |
| 2,165,800 | Koch | July 11, 1939 |
| 2,204,438 | Heufeld | June 11, 1940 |
| 2,403,626 | Wolff | July 9, 1946 |
| 2,423,337 | Moseley | July 1, 1947 |

FOREIGN PATENTS

| Number | Country | Date |
|---|---|---|
| 224,604 | Great Britain | Nov. 20, 1924 |